(12) United States Patent
Hoshi et al.

(10) Patent No.: US 7,473,748 B2
(45) Date of Patent: Jan. 6, 2009

(54) VINYL MONOMER WITH SUPERACID ESTER GROUP AND POLYMER OF THE SAME

(75) Inventors: Nobuto Hoshi, Fuji (JP); Nobuyuki Uematsu, Fuji (JP); Oliver Gronwald, Goettingen (DE); Takehiro Koga, Fuji (JP); Masanori Ikeda, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 317 days.

(21) Appl. No.: 11/038,571

(22) Filed: Jan. 21, 2005

(65) Prior Publication Data

US 2005/0209421 A1    Sep. 22, 2005

(30) Foreign Application Priority Data

Jan. 22, 2004  (JP) .............................. 2004-014180
Mar. 8, 2004   (JP) .............................. 2004-063639

(51) Int. Cl.
    *C08F 12/30* (2006.01)
(52) U.S. Cl. ........................ 526/243; 526/247; 526/248; 526/250; 526/287
(58) Field of Classification Search ................. 526/243, 526/247, 250, 248, 287
    See application file for complete search history.

(56) References Cited

U.S. PATENT DOCUMENTS

| | | | | |
|---|---|---|---|---|
| 3,560,568 A | * | 2/1971 | Resnick | ....................... 562/111 |
| 4,181,592 A | * | 1/1980 | Babinsky | ..................... 204/283 |
| 4,587,274 A | * | 5/1986 | Nakahara et al. | ............. 522/126 |
| 5,260,046 A | * | 11/1993 | Pierotti | ..................... 423/245.1 |
| 5,463,005 A | | 10/1995 | Desmarteau | ................ 526/240 |
| 6,274,677 B1 | | 8/2001 | Tatemoto | .................... 525/276 |

FOREIGN PATENT DOCUMENTS

| | | |
|---|---|---|
| JP | 47-2083 | 1/1972 |
| JP | 57-92026 | 6/1982 |
| JP | 61-133211 | 6/1986 |
| JP | 2002-212234 | * 7/2002 |
| WO | 98/43952 | 10/1998 |
| WO | 03/050151 A1 | 6/2003 |

OTHER PUBLICATIONS

Chen et al., J. Org. Chem., vol. 54, pp. 3023-3027, (1989).*
Patel et al., Inorg. Chem., vol. 33, pp. 5463-5470, (1994).*
Zhang et al., J. Fluorine Chem., vol. 116, 00. 45-48, (2002).*
O. Savadogo, "Emerging membranes for electrochemical systems: (1) solid polymer electrolyte membranes for fuel cell systems," Journal New Materials for Electrochemical Systems, vol. 1, p. 47-66, 1998.
Creager et al., "New Bis [(Perfluroralkyl) Sulfonyl] Imide Inomers For Pem Fuel Cells," Polymeric Materials Science and Engineering—Washington-, vol. 80, p. 600, 1999.
Shuang Zhou, "Synthesis and Characterization of Perfluorinated Sulfonimide Copolymers as Polymer Electrolyte Membranes," Ph.D. Thesis, Clemson University, Dec. 2002.
Lixin Xue, "Chemistry of BIS (Perfluoroalkylsulfonyl) Imides and Related Compounds", Ph.D. Thesis, Clemson University, Aug. 1996.
Rollins et al., Nanoscale Cavities for Nanoparticles in Perfluorinated Ionomer Membranes; Langmuir, vol. 16, p. 8031-p. 8036, 2000.

* cited by examiner

*Primary Examiner*—Peter D. Mulcahy
*Assistant Examiner*—Henry Hu
(74) *Attorney, Agent, or Firm*—Staas & Halsey LLP

(57) ABSTRACT

A superacidic ester group is useful in the production of ionomers for polymer electrolyte fuel cells. A polymer is produced from said vinyl monomer. A process produces a polymer containing a superacidic group. The vinyl monomer contains a haloalkyl ester group of a superacid, wherein the number of carbon atoms of the haloalkyl ester group is no more than 10, and the halogen in the haloalkyl group is chlorine and/or fluorine. A polymer containing said vinyl monomer as a repeating unit can be converted to a polymer containing a superacid group using at least one procedure of 1) heat treating at 50°C. to 350°C., and 2) contacting with a protic compound.

10 Claims, No Drawings

VINYL MONOMER WITH SUPERACID ESTER GROUP AND POLYMER OF THE SAME

TECHNICAL FIELD

The present invention relates to a novel vinyl monomer, containing a superacidic ester group, useful in the production of ionomers for solid polymer electrolyte fuel cells and its production process. In addition, the present invention relates to a novel polymer produced from said vinyl monomer and its production process, as well as a process for producing a polymer containing a superacidic group from said polymer.

BACKGROUND ART

In recent years, fuel cells using a solid polymer membrane as an electrolyte have attracted attention because they can be made smaller and lightweight and provide a high output density even at comparatively low temperatures, prompting acceleration of their development.

Solid polymer materials used for this purpose are required to have superior proton conductivity, suitable moisture retention and impermeability to gases such as hydrogen and oxygen. Various studies have been conducted on polymers having groups such as sulfonic acid groups and phosphonic acid groups as materials that satisfy these requirements, and numerous such materials have been proposed (refer to, for example, O. Savadogo, Journal of New Materials for Electrochemical Systems I, 47-66 (1998)).

However, under actual fuel cell operating conditions, active oxygen species are generated at the electrodes and have a high level of oxidizing power. Thus, in order for the fuel cell to operate in a stable manner, and over a long period of time in particular, it is required to be durable in this type of harsh oxidizing atmosphere. Although numerous hydrocarbon-based materials have been reported that demonstrate superior characteristics with respect to characteristics of the fuel cell during initial operation, thus far they have problems in terms of oxidation resistance.

Consequently, perfluorosulfonic acid polymers having the repeating unit shown in formula (15) below are currently mainly being used in studies targeted at practical application.

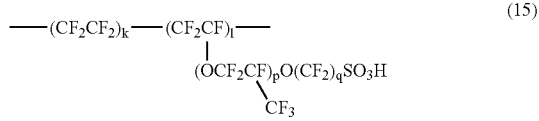

(15)

(wherein, k and l represent integers such that k/l is 3 to 10, p is 0 or 1, and q is 2 or 3).

In addition, in fuel cells, not only the membrane, but also the catalyst surface of the gas diffusion electrode, are required to have continuous proton conductivity, and similar perfluorosulfonic acid polymers are used as the binder of this electrode catalyst as well.

On the other hand, as bis-sulfonylimide groups are known to demonstrate greater superacidity as compared with sulfonic acid groups, polymers having bis-sulfonylimide groups instead of sulfonic acid groups have expected to become new materials for electrochemical processes, although they are still under development.

These fluorinated sulfonic acid polymers and fluorinated bis-sulfonylimide polymers are referred to as superacid polymers because their acidic groups demonstrate stronger acidity that even sulfuric acid.

First, an explanation is provided of the background art relating to perfluorosulfonic acid polymers.

The aforementioned perfluorosulfonic acid polymers are obtained by carrying out a hydrolysis reaction on a copolymer of a perfluorovinyl ether represented by the following formula (16) and tetrafluoroethylene (TFE).

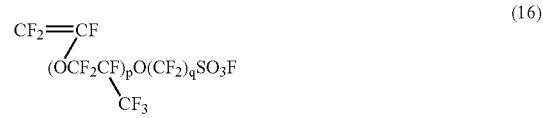

(16)

(wherein, p and q are defined in the same manner as in the aforementioned formula (15)).

A technique is normally used for the hydrolysis reaction in which, after having converted a polymer, in which the end of the side chain is in an —$SO_2F$ form, to a sulfonic acid salt form using a base such as NaOH or KOH, it is further converted to an —$SO_3H$ form by an acid such as hydrochloric acid.

In the case of using this polymer as a membrane, methods are known in which the hydrolysis reaction is carried out after forming a membrane out of a polymer, in which the end of the side chain is in the —$SO_2F$ form, by heat molding (a melt molding membrane formation process), or a solution or dispersion, in which an —$SO_3H$ type polymer has been subjected to dissolution treatment, is formed into a membrane by casting (a casting membrane formation process). In addition, in the case of using it as a catalyst binder, a method in which a solution or dispersion of —$SO_3H$ type polymer is coated onto a catalyst layer, or a method in which said solution or dispersion is mixed with a catalyst and then coated onto a substrate followed by drying, is typically employed.

Among these methods, as the melt molding membrane formation process causes extensive swelling of the membrane during the course of hydrolysis, it presents difficulties in handling. On the other hand, although the casting membrane formation process, or a solution or dispersion for use in a binder, involves dissolution treatment of a sulfonic acid polymer, it is necessary to hydrolyze an —$SO_2F$ type polymer in advance. At that time, it was necessary to first convert to a sulfonic acid salt form with base followed by conversion to a sulfonic acid form by acid treatment and finally washing with water as previously described. As it is necessary, in particular, to carry out acid treatment completely to prevent any salt from remaining, the process involving this alkaline hydrolysis had numerous complex steps.

Furthermore, as the spacer portions between the main chain and sulfonic acid groups are shorter in the case p=0 than in the case p=1 in the polymer represented by the aforementioned formula (15), it demonstrates a high glass transition temperature and high strength, and is also preferable in terms of heat resistance. However, the yield of the monomer represented by the aforementioned formula (16) (p=0), that serves as its raw material, is extremely low due to an extensive side reaction in the form of a cyclization reaction that occurs in its production process. In the case q=3, for example, although a fluorinated monomer is obtained, its yield is at most about 50% due to the occurrence of a side reaction in the form of a cyclization reaction, and in the case q=2, only the cyclization reaction proceeds, preventing any fluorinated monomer being obtained.

Therefore, in order to solve the problems associated with monomer synthesis in the case p=0 in formula (16), a fluorinated monomer having a sulfonic acid precursor group capable of being derived to sulfonic acid has been proposed for the structure other than the —SO$_2$F groups. For example, although International Unexamined Patent Publication No. 98/43952 and Japanese Examined Patent Publication No. 47-2083 describe a production process of a monomer in which the functional groups are replaced with sulfonic acid salts, this salt-type monomer cannot be purified by distillation since it lacks volatility, thereby making it difficult to obtain a highly pure product, and also has the problem of difficulty in membrane formation following polymerization. In addition, although a method has also been proposed in which a salt-type monomer is converted to an —SO$_2$F form, this method was excessively complex.

In addition, although a methyl ester form is described in Japanese Unexamined Patent Publication No. 61-133211 as an example of monomers and polymers having a sulfonic acid ester structure, as methyl esters of sulfonic acid degrade in the presence of humidity and have such high levels of reactivity that they are used as alkylating agents, they have not been used practically due to handling difficulties in air.

On the other hand, monomers and polymers containing bis-sulfonylimide groups were first synthesized by DesMarteau, et al. For example, the following monomers and polymers are reported in U.S. Pat. No. 5,463,005.

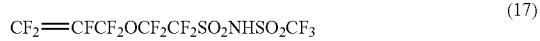

(17)

(18)

(19)

(20)

With respect to the monomers of (17), (18) and (19), copolymers with TFE are synthesized by aqueous emulsion polymerization, and the results of evaluation for use as a fuel cell membrane for a copolymer with (18) are reported in the literature (DesMarteau, et al., Polym. Mater. Sci. Eng. 1999, 80, 600) as having an ion exchange capacity represented with equivalent weight (to be represented by EW, with smaller values indicating larger ion exchange capacities) of 1175 to 1261 g/eq. In addition, ionomers having several types of bis-sulfonylimide groups, including a copolymer with (18) that is described in the literature (Zhou, Ph.D. thesis 2002, Clemson Univ.) as having an EW of 1175 g/eq, are reported to demonstrate higher thermal stability than ionomers having sulfonic acid groups. Moreover, a copolymer of the monomer of formula (21) below and TFE described in the literature (Xue, Ph.D. thesis 1996, Clemson Univ.) as having an EW of 970 g/eq is synthesized by aqueous emulsion polymerization.

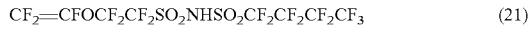

(21)

In all of these reports in the literature, copolymerization with TFE is carried out by aqueous emulsion polymerization after having converted a bis-sulfonylimide group-containing monomer into a salt form, and typically only polymers having a large EW (of nearly 1100 g/eq or more) have been obtained. Alternatively, polymers having a small EW were first obtained by increasing the size of the terminal perfluoroalkyl group in the manner of copolymerization with monomer (21). (However, an excessively large terminal perfluoroalkyl group results in the problem of lowering Tg, and since it is also difficult to form a cluster of bis-sulfonylimide groups, there is the disadvantage of low proton conductivity relative to EW.) This is thought to be due to it having been difficult to create polymers having a high ion exchange group density (low EW) due to the low solubility in other fluorine-containing monomers in the case of monomers having a short terminal perfluoroalkyl group or short chain monomers having short spacer sections and, particularly, in the case of having been converted to a salt form.

In addition, if bis-sulfonylimide groups are left in acidic form, as it becomes difficult for the polymerization initiator to dissolve in a fluorine-containing solvent, or degradation may result due to the action of strong acid in the case of polymerization initiators like fluorine-containing diacylperoxides, it was not possible to carry out solution polymerization at a high monomer concentration using fluorine-containing solvents.

On the other hand, a process is described in Japanese Unexamined Patent Publication No. 2002-212234 in which a bis-sulfonylimide group-containing polymer is produced by reacting a polymer having an —SO$_2$F terminal of the prior art with, for example, CF$_3$SO$_2$NH$_2$. In this process, although it is possible to produce a polymer having high density of ion exchange groups by using a polymer having high density of —SO$_2$F groups, in this case, as a side reaction in the form of the reaction with water is much faster, it is difficult to avoid the presence of sulfonic acid groups that lower thermal stability in the resulting polymer, thereby impairing the thermal stability that characterizes bis-sulfonylimide group-containing polymers. In addition, although the resulting bis-sulfonylimide group-containing polymer is obtained in the form of a tertiary amine salt or another salt, as the salt is difficult to remove, it is difficult to completely convert to the acid form.

Thus, a process has heretofore not been known for efficiently producing a highly pure bis-sulfonylimide group-containing polymer having a high density of ion exchange groups and high thermal stability as a result of not containing sulfonic acid groups.

Furthermore, International Unexamined Patent Publication No. 03/050151 describes the general formula of an ionomer containing a bis-sulfonylimide group, and although the structure of an ionomer containing a partially fluorinated alkyl group having 2 to 10 carbon atoms as the N terminal group is disclosed therein, no further detailed description is provided. Namely, there are no descriptions contained in International Unexamined Patent Publication No. 03/050151 relating to a monomer, its production process or its utilization methods of the present application.

A method for forming a membrane by casting, in which a dimethylformamide (DMF) solution of a bis-sulfonylimide group-containing ionomer is employed, is described in the literature (DesMarteau, et al., Langmuir 2000, 16, 8031). However, in the case of a DMF solution, it is difficult to completely remove the solvent due to its high boiling point. Moreover, DMF is partially degraded by a strong acid such as bis-sulfonylimide and, as the degradation product is toxic to fuel cell catalysts, it could not be used in applications such as the production of gas diffusion electrodes. Thus, a solution of a bis-sulfonylimide group-containing polymer that is suitable for production of casting membranes and production of gas diffusion electrodes has heretofore not been known.

SUMMARY OF THE INVENTION

The object of the present invention is to provide a precursor monomer having a novel structure, along with a polymer of said monomer, that allow the use of an extremely simple process not found in the prior art to produce a fluorinated superacid polymer that is useful as a polymer electrolyte for a solid polymer electrolyte fuel cell, and a fluorinated superacid polymer solution or dispersion.

In the case of a fluorinated sulfonic acid polymer in particular, a precursor monomer and polymer of the same are provided that allow a fluorinated sulfonic acid polymer to be produced easily without going through a complex alkaline hydrolysis step and, in the case of a bis-sulfonylimide group-containing polymer, a precursor monomer and polymer of the same are provided that allow a polymer having a high density of ion exchange groups but free of sulfonic acid groups to be produced efficiently.

The inventors of the present invention found that a monomer that contains a specific ester group of a superacid can be synthesized easily and can be handled easily as a result of having suitable stability, while also finding that said superacidic ester group in a polymer that contains this monomer unit can be converted to a superacid group by a simple method, thereby leading to completion of the present invention.

A vinyl monomer containing a haloalkyl ester group of a superacid, wherein the number of carbon atoms of the haloalkyl ester group is no more than 10, and the halogen in the haloalkyl group is chlorine and/or fluorine.

In the vinyl monomer described above, the haloalkyl group may be a hydrocarbon group containing chlorine and/or fluorine represented by the following formula (1):

$$-CR^1R^2CHR^3R^4 \qquad (1)$$

(wherein, $R^1$, $R^2$, $R^3$ and $R^4$ are respectively and independently selected from the group consisting of a chlorine atom, fluorine atom, hydrogen atom, hydrocarbon group having 1 to 8 carbon atoms and hydrocarbon group containing chlorine and/or fluorine having 1 to 8 carbon atoms, at least one of $R^1$, $R^2$, $R^3$ and $R^4$ is a group selected from the group consisting of a chlorine atom, fluorine atom and hydrocarbon group containing chlorine and/or fluorine, and $R^1$, $R^2$, $R^3$ and $R^4$ may be respectively linked to form a ring structure).

In the vinyl monomer described above, wherein the haloalkyl ester group of a superacid may be a haloalkyl ester group of sulfonic acid represented by the following formula (2):

$$-(CF_2)_m SO_3 R \qquad (2)$$

(wherein, m represents an integer of 1 to 6, and R represents a haloalkyl group having no more than 10 carbon atoms).

In the vinyl monomer described above, the vinyl monomer may be represented by the following formula (3):

$$(3)$$

(wherein, n represents an integer of 0 or 1, and m and R are the same as defined in the aforementioned formula (2)).

In the vinyl monomer described above, wherein the vinyl monomer may be represented by the following formula (4):

$$CF_2=CFO(CF_2)_m SO_3 R \qquad (4)$$

(wherein, m and R are the same as defined in the aforementioned formula (2)).

In the vinyl monomer described above, wherein the haloalkyl ester group of a superacid may be a haloalkyl ester group of a bis-sulfonylimide represented by the following formula (5):

$$-(CF_2)_m SO_2 NRSO_2 R_f^1 \qquad (5)$$

(wherein, m represents an integer of 1 to 6, R represents an haloalkyl group having no more than 10 carbon atoms, $R_f^1$ represents a perfluoroalkyl group having 1 to 10 carbon atoms, an ether group, $-SO_2NR^aSO_2-$ or $-SO_2X$ (wherein X represents a fluorine atom or $-OR^b$) may be contained in $R_f^1$, and $R^a$ and $R^b$ are respectively and independently selected from the aforementioned R).

In the vinyl monomer described above, the vinyl monomer may be represented by the following formula (6):

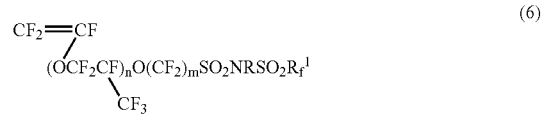
$$(6)$$

(wherein, n, m and R are the same as defined in the aforementioned formula (3), and $R_f^1$ is the same as defined in the aforementioned formula (5)).

In the vinyl monomer described above, the vinyl monomer may be represented by the following formula (7):

$$CF_2=CFO(CF_2)_m SO_2 NRSO_2 R_f^1 \qquad (7)$$

(wherein, m and R are the same as defined in the aforementioned formula (3), and $R_f^1$ is the same as defined in the aforementioned formula (5)).

A production process of the vinyl monomer involves reacting a vinyl monomer containing a sulfonic acid group represented by the following formula (9) with a haloolefin represented by the following formula (10):

$$-(CF_2)_m SO_3 H \qquad (9)$$

(wherein, m is the same as defined in the aforementioned formula (2)); and $$CR^1R^2=CR^3R^4 \qquad (10)$$

(wherein, $R^1$, $R^2$, $R^3$ and $R^4$ are the same as defined in the aforementioned formula (1)).

A production process of a vinyl monomer involves reacting a vinyl monomer containing a sulfonic acid group represented by the following formula (11) with a haloolefin represented by the aforementioned formula (10):

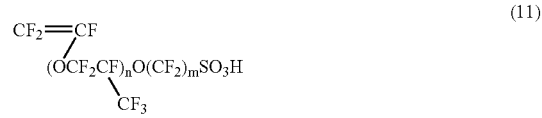
$$(11)$$

(wherein, n and m are the same as defined in the aforementioned formula (3)).

A production process of a vinyl monomer involves reacting a vinyl monomer containing a bis-sulfonylimide group represented by the following formula (12) with a haloolefin represented by the aforementioned formula (10):

$$—(CF_2)_mSO_2NHSO_2R_f^2 \quad (12)$$

(wherein, m is the same as defined in the aforementioned formula (5), $R_f^2$ represents a perfluoroalkyl group having 1 to 10 carbon atoms, and an ether group, —$SO_2NHSO_2$— or —$SO_2Y$ (wherein Y represents a fluorine atom or —OH) may be contained in $R_f^2$).

A production process of a vinyl monomer involves reacting a vinyl monomer containing a bis-sulfonylimide group represented by the following formula (13) with a haloolefin represented by the aforementioned formula (10):

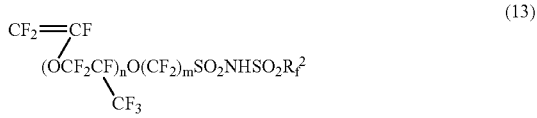

$$CF_2{=}CF \atop (OCF_2CF)_nO(CF_2)_mSO_2NHSO_2R_f^2 \atop CF_3 \quad (13)$$

(wherein, n and m are the same as defined in the aforementioned formula (6), and $R_f^2$ is defined in the same manner as in the aforementioned formula (12)).

A polymer may contain as a repeating unit at least one type of vinyl monomer described above.

A copolymer may include at least one type of vinyl monomer described above and tetrafluoroethylene.

A production process of the polymer described above involves solution polymerizing a vinyl monomer described above either alone or with another monomer.

A production process of a fluorinated superacid polymer involves converting a fluorinated polymer containing an haloalkyl ester group of a superacid (provided that the haloalkyl group has no more than 10 carbon atoms and the halogen in the haloalkyl group is chlorine and/or fluorine) to a polymer containing a superacid group using at least one procedure of 1) heat treating at 50° C. to 350° C., and 2) contacting with a protic compound.

In the production process of a fluorinated superacid polymer described above, the haloalkyl group may be a hydrocarbon group having at least one hydrogen atom on the carbon atom at position 2, containing chlorine and/or fluorine, and having 2 to 10 carbon atoms.

In the production process of a fluorinated superacid polymer described above, the haloalkyl group may be a hydrocarbon group containing chlorine and/or fluorine represented by the aforementioned formula (1).

In the production process of a fluorinated superacid polymer described above, the fluorinated polymer containing a haloalkyl ester group of a superacid may be a polymer obtained by homopolymerizing a vinyl monomer described above or copolymerizing said vinyl monomer with another monomer.

In the production process of a fluorinated superacid polymer described above, the superacid group may be a fluoroalkylsulfonic acid group or a bis(fluoroalkylsulfonyl)imide group.

In the production process of a fluorinated superacid polymer described above, the fluorinated polymer containing a haloalkyl ester of a superacid may be a polymer containing as a repeating unit a monomer unit having the structure represented by the aforementioned formula (3).

In the production process of a fluorinated superacid polymer described above, the fluorinated polymer containing a haloalkyl ester group of a superacid may be a polymer containing as a repeating unit a monomer unit having the structure represented by the aforementioned formula (6).

In the production process of a fluorinated superacid polymer described above, the fluorinated polymer containing a haloalkyl ester group of a superacid may be a copolymer comprising a monomer represented by the aforementioned (3) and/or (6) and tetrafluoroethylene.

In the production process of a fluorinated superacid polymer described above the fluorinated polymer containing a haloalkyl ester group of a superacid may be converted to a polymer containing a superacid group by a procedure comprising heat treating at 50° C. to 350° C.

In the production process of a fluorinated superacid polymer described above, the haloalkyl group in the haloalkyl ester group may be a fluoroalkyl group.

A bis-sulfonylimide group-containing polymer has a repeating unit represented by the following formula (14), wherein said polymer does not contain a sulfonic acid group and has an equivalent weight of 500 to 1500 g/eq.

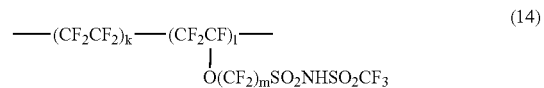

$$—(CF_2CF_2)_k—(CF_2CF)_l— \atop O(CF_2)_mSO_2NHSO_2CF_3 \quad (14)$$

(wherein, m is the same as defined in the aforementioned formula (3), and k and l represent numerical values for which k/l represents the molar ratio of each monomer unit).

A production process of a solution or dispersion of a fluorinated superacid polymer involves dissolving a fluorinated superacid polymer produced with the process described above in a solvent containing a protic compound.

A production process of a solution or dispersion of a fluorinated superacid polymer involves heating a fluorinated polymer containing a haloalkyl ester group of a superacid to 50° C. to 250° C. in a solvent containing a protic compound.

A production process of a fluorinated superacid polymer membrane involves casting a solution or dispersion of a fluorinated superacid polymer produced by the process described above to form a fluorinated superacid polymer membrane having a thickness of 5 to 200 μm.

A fuel cell membrane/electrode assembly (MEA) has a membrane and/or catalyst binder produced from a solution or dispersion of a fluorinated superacid polymer produced by the method described above.

In a solution or dispersion of a bis-sulfonylimide group-containing polymer, the bis-sulfonylimide group-containing polymer may be dissolved or dispersed in a solvent containing 10% by weight or more of a protic compound.

In a solution or dispersion of a polymer containing a haloalkyl ester group of bis-sulfonylimide, a polymer containing at least one type of vinyl monomer unit described above may be dissolved or dispersed in a fluorine-containing solvent.

A fuel cell gas diffusion electrode has a catalyst binder polymer produced from a solution or dispersion of the bis-sulfonylimide group-containing polymer described above.

A fuel cell gas diffusion electrode has a catalyst binder produced from the solution or dispersion of a polymer containing a haloalkyl ester group of bis-sulfonylimide described above.

In a composite membrane a bis-sulfonylimide group-containing polymer may be filled into a porous film.

A production process of the composite membrane described above may involve impregnating a porous film with the solution or dispersion of a bis-sulfonylimide group-containing polymer described above.

A production process of the composite membrane described above may involve impregnating a porous film with the solution or dispersion of a polymer containing a haloalkyl ester group of bis-sulfonylimide described above.

As a result of using a monomer and polymer of the present invention, a fluorinated superacid polymer useful as a polymer electrolyte for solid polymer electrolyte fuel cells, and a fluorinated superacid polymer solution or dispersion, can be produced using an extremely simple method not found in the prior art.

In the case of a fluorinated sulfonic acid polymer in particular, a fluorinated sulfonic acid polymer can be produced easily without having to go through a complex alkaline hydrolysis step, while in the case of a bis-sulfonylimide group-containing polymer, a polymer can be efficiently produced that has a high ion exchange group density and is free of sulfonic acid groups.

DETAILED DESCRIPTION OF THE PREFERRED EMBODIMENTS

Alkyl esters of superacids are typically extremely unstable, and easily react with moisture in the air resulting in hydrolysis. Consequently, alkyl esters of sulfonic acid, for example, are conversely used as alkylating agents by taking advantage of this high level of reactivity.

However, by employing a haloalkyl ester structure, in which a portion of the alkyl groups are substituted with chlorine or fluorine, instead of an alkyl ester structure, the superacid ester groups can be made to have suitable stability, allowing stable handling when handling the monomers and during polymerization. On the other hand, haloalkyl groups have been determined to be easily removed under specific conditions resulting in the acid form. In actuality, in contrast to 88% of a methyl ester of perfluoroalkanesulfonic acid degrading in 1 hour in water at room temperature, a —$CF_2CH_3$ ester of the same sulfonic acid remains stable without degrading even after 1 week in water at room temperature. The present invention applies this favorable handling stability of such haloalkyl ester groups to the production of monomers and polymers.

In the present invention, a superacid is defined as an acid that demonstrates stronger acidity than sulfuric acid, and preferable examples thereof are fluoroalkyl sulfonic acid and bis(fluoroalkylsulfonyl)imide. Furthermore, in explaining esters of bis(fluoroalkylsulfonyl)imide, as the N—H of bis(fluoroalkylsulfonyl)imide is known to be a superacid, and as its N-alkyl substituent can be considered to be an ester form in the same manner as the ester form of other types of acids, it is expressed as an ester in the present invention.

A haloalkyl group within the haloalkyl ester group of a superacid used in the present invention is an alkyl group that has been substituted with chlorine and/or fluorine, and may contain an ether bond within the alkyl group. In the case of containing an ether bond, the ratio of the number of ether bonds to the number of carbon atoms is preferably 0.5 or less, more preferably 0.35 or less, even more preferably 0.25 or less and most preferably 0.2 or less. If the ratio of the number of ether bonds to the number of carbon atoms is excessively large, the stability of the haloalkyl group portion decreases easily.

Although the number of carbon atoms that compose the haloalkyl group in the ester group is no more than 10, it is preferably 2 to 8, more preferably 2 to 6, even more preferably 2 to 4, particularly preferably 2 to 3, and most preferably 2 in consideration of ease of manipulation. In addition, as the stability of the ester group decreases if the substituted locations of halogen atoms are excessively far from the superacid group, position 1 and/or position 2 is preferably substituted with a halogen atom or halogen-containing hydrocarbon group, and in the case of a halogen-containing hydrocarbon group, a perhalohydrocarbon group is preferable.

Specific examples of haloalkyl groups present in the ester group include, for example, —$CHClCH_3$, —$CH_2CHCl_2$, —$CCl_2CH_3$, —$CH_2CHCl_2$, —$CCl_2CH_2Cl$, —$CHClCHCl_2$, —$CCl_2CHCl_2$, —$CCl_2CHFCl$, —$CFClCHCl_2$, —$CHFCH_3$, —$CH_2CHF_2$, —$CF_2CH_3$, —$CH_2CHF_2$, —$CF_2CH_2F$, —$CHFCHF_2$, —$CF_2CHF_2$, —$CH(CF_3)CH_2F$, —$CH_2CH_2CF_3$, —$CH_2CCl_3$, —$CH_2CHCl_2$, —$CH_2CF_3$, —$CH_2CF_2CF_3$, —$CH_2CF_2CHF_2$, —$CH(CF_3)_2$, —$CH_2CF_2CF_2CF_3$, —$C(CF_3)_3$, —$C_6F_6$, —$CH_2CF_2CHFCF_3$, —$CH_2CF_2CF_2CF_2CHF_2$, —$CH_2CF_2CF_2CF_2CF_2CHF_2$, —$CH_2CH_2CF_2CF_2CF_2CF_3$, —$CH_2CF(CF_3)OCF_2CF_2CF_3$, —$CH_2CF(CF_3)OCF(CF_3)_2$, —$CH_2CF_2OCF_2CF_3$ and —$CH_2CF_2CF_2CH_2OCH_2CH_2OCH_2CH_2OCH_3$.

In the case of producing a fluorinated polymer containing a haloalkyl ester group of a superacid by polymerizing a fluorinated vinyl monomer containing a haloester group of a superacid, a fluoroalkyl group is preferable for the haloalkyl group since there is no risk of impairing polymerization.

Although the haloalkyl group in the ester group may be a perhaloalkyl group, a partial haloalkyl group is preferable, and the ratio of the number of halogen atoms to (the number of halogen atoms+the number of carbon atoms) is preferably within the range of 0.1 to 0.9, more preferably within the range of 0.25 to 0.75, and most preferably within the range of 0.33 to 0.6.

A haloalkyl group substituted with hydrogen at position 2 is particularly preferable as it facilitates the production of a vinyl monomer of the present invention by an addition reaction of a haloolefin to a fluorinated vinyl monomer having a superacid group as will be described later. Namely, the haloalkyl group in the haloalkyl ester group of a superacid preferably has the structure represented by the following formula (1):

—$CR^1R^2CHR^3R^4$ (1)

(wherein, $R^1$, $R^2$, $R^3$ and $R^4$ are respectively and independently selected from the group consisting of a chlorine atom, fluorine atom, hydrogen atom, hydrocarbon group having 1 to 8 carbon atoms and hydrocarbon group containing chlorine and/or fluorine having 1 to 8 carbon atoms, at least one of $R^1$, $R^2$, $R^3$ and $R^4$ is a group selected from the group consisting of a chlorine atom, fluorine atom and hydrocarbon group containing chlorine and/or fluorine, and $R^1$, $R^2$, $R^3$ and $R^4$ may be respectively linked to form a ring structure).

Moreover, the haloalkyl group substituted with hydrogen at position 2 is preferable because it facilitates de-esterification in the case of producing a fluorinated superacid polymer by heat treatment at 50° C. to 350° C. In addition, in this case, since the haloolefin of the monomer raw material is eliminated, it can be recovered and reused.

In addition, at least one of $R^1$ and $R^2$ is preferably a halogen atom, more preferably both are halogen atoms, and even more preferably both halogen atoms are fluorine atoms. Although at least one hydrogen atom is bonded at position 2 of the haloalkyl group of formula (1), more preferably two or more hydrogen atoms are bonded.

Specific examples of the haloalkyl group of formula (1) include, for example —CHClCH$_3$, —CH$_2$CHCl$_2$, —CCl$_2$CH$_3$, —CH$_2$CHCl$_2$, —CCl$_2$CH$_2$Cl, —CHClCHCl$_2$, —CCl$_2$CHCl$_2$, —CCl$_2$CHFCl, —CFClCHCl$_2$, —CHFCH$_3$, —CH$_2$CHF$_2$, —CF$_2$CH$_3$, —CH$_2$CHF$_2$, —CF$_2$CH$_2$F, —CHFCHF$_2$, —CF$_2$CHF$_2$, —CH(CF$_3$)CH$_2$F and —CH$_2$CH$_2$CF$_3$. Among these, a fluoroalkyl group is preferable, and —CF$_2$CH$_3$ is more preferable.

Although a vinyl monomer of the present invention may be any vinyl monomer provided it has the aforementioned haloalkyl ester group of a superacid, it is preferably a vinyl monomer having a haloalkyl ester group of sulfonic acid represented by the following formula (2), or a vinyl monomer having a haloalkyl ester group of bis-sulfonylimide (referred to as an imido ester group) represented by the following formula (5):

—(CF$_2$)$_m$SO$_3$R                         (2)

(wherein, m represents an integer of 1 to 6, and R represents a haloalkyl group having no more than 10 carbon atoms);

—(CF$_2$)$_m$SO$_2$NRSO$_2$R$_f^1$               (5)

(wherein, m represents an integer of 1 to 6, R represents an haloalkyl group having no more than 10 carbon atoms, R$_f^1$ represents a perfluoroalkyl group having 1 to 10 carbon atoms, an ether group, —SO$_2$NR$^a$SO$_2$— or —SO$_2$X (wherein X represents a fluorine atom or —OR$^b$) may be contained in R$_f^1$, and R$^a$ and R$^b$ are respectively and independently selected from the aforementioned R).

A vinyl monomer of the present invention affords easily handling because it has suitable stability, and allows solution polymerization in a fluorine-containing solvent. This differs from vinyl monomers of the prior art that were only applicable to emulsion polymerization, and especially differs from bis-sulfonylimide monomers of the prior art. Even so, the polymer following polymerization has the characteristic of enabling the ester group to be converted to a superacid by an extremely easy treatment.

In the aforementioned formulas (2) and (5), R preferably has at least one hydrogen atom on the carbon atom at position 2.

Although a vinyl group and the ester group of a superacid represented by formulas (2) and (5) may be bonded directly, they are preferably bonded through a linking group such as a bivalent organic group or an ether group. In addition, although there are no particular restrictions on the type of vinyl group or linking group, the vinyl group is preferably a fluorine-containing vinyl group, and more preferably a trifluorovinyl group, from the viewpoint of chemical stability. In addition, an oxygen atom is preferably directly bonded to the vinyl group as this results in superior polymerization. In other words, a vinyl ether is preferable. An ether group or a fluorine-containing organic group that may or may not contain an ether group is preferably for the linking group, and an ether group or a perfluoroalkylene group which may or may not contain an ether group is most preferable.

Although m represents an integer of 1 to 6 in formula (2) or (5), it preferably represents an integer of 2 to 6, and more preferably an integer of 2 to 4.

Although R$_f^1$ represents a perfluoroalkyl group having 1 to 10 carbon atoms in formula (5), an ether group, —SO$_2$NR$^a$SO$_2$— or —SO$_2$X (wherein X represents a fluorine atom or —OR$^b$) may be contained in R$_f^1$, and R$^a$ and R$^b$ are respectively and independently selected from the aforementioned R. Here, although —SO$_2$NR$^a$SO$_2$— or —SO$_2$X may be contained in R$_f^1$ in the case of desiring to increase the number of acid radicals per side chain, in the case of desiring to obtain a polymer having high thermal stability, an —SO$_2$X group is preferably not contained. In the case of containing an —SO$_2$NR$^a$SO$_2$— group, the number of said groups is preferably two or less, and more preferably one. In addition, in the case of containing an ether group, the number of said groups is preferably three or less, more preferably two or less and even more preferably one. The number of carbon atoms of R$_f^1$ is preferably 1 to 6, more preferably 1 to 4, even more preferably 1 to 2, and most preferably one, namely R$_f^1$ is a CF$_3$ group.

A preferable specific example of a vinyl monomer having a haloalkyl ester group of sulfonic acid represented by formula (2) is the vinyl monomer represented by the following formula (3):

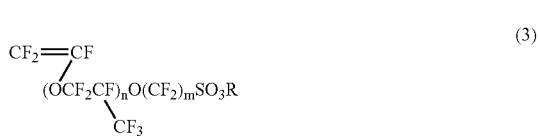

(wherein, n represents an integer of 0 or 1, and m and R are defined in the same manner as in the aforementioned formula (2)).

In formula (3), n preferably represents 0, and the vinyl monomer is preferably that represented by the following formula (4):

CF$_2$=CFO(CF$_2$)$_m$SO$_3$R                    (4)

(wherein, m and R are defined in the same manner as in the aforementioned formula (2)).

On the other hand, a preferable specific example of a vinyl monomer having an imido ester group represented by formula (5) is the vinyl monomer represented by the following formula (6):

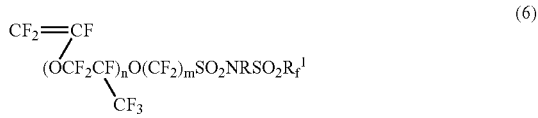

(wherein, n, m and R are defined in the same manner as in the aforementioned formula (3), and R$_f^1$ is defined in the same manner as the aforementioned formula (5)).

In formula (6), n is preferably 0 and particularly preferably the vinyl monomer represented by the following formula (7):

CF$_2$=CFO(CF$_2$)$_m$SO$_2$NRSO$_2$R$_f^1$         (7)

(wherein, m and R are defined in the same manner as in the aforementioned formula (3), and R$_f^1$ is defined in the same manner as the aforementioned formula (5)).

Next, an explanation is provided of the production process of a vinyl monomer containing a haloalkyl ester group of a superacid.

First, an explanation is provided of the production process of a vinyl monomer containing a haloalkyl ester group of sulfonic acid using as an example the monomer represented by the aforementioned formula (3).

Any of the processes indicated below can also be applied to the production of a monomer in which n=0 in the aforementioned formula (3), and are superior with respect to facilitating production of a polymer in which p=0 in the aforementioned formula (15), which was difficult in the prior art.

1) Esterification→Vinylation Process

In this process, the acid fluoride represented by the following formula (22) is reacted with a carbonate such as sodium carbonate:

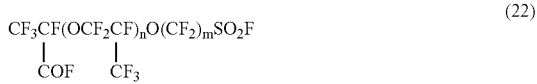

(22)

(wherein, n and m are defined in the same manner as the aforementioned formula (3)), it is then converted to the carbonate salt represented by the following formula (23):

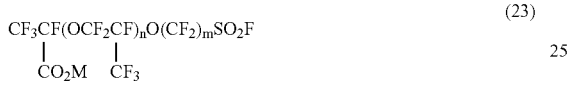

(23)

(wherein, M represents an alkaline metal such as Na or K, and n and m are defined in the same manner as the aforementioned formula (3)), this is then either reacted with the equivalent haloalcohol in the presence of base or reacted with an alkaline metal alkoxide of the equivalent haloalcohol to produce the ester represented by the following formula (24):

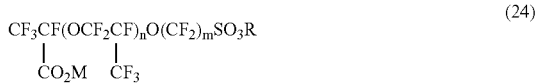

(24)

(wherein, M is defined in the same manner as the aforementioned formula (23), and n, m and R are defined in the same manner as the aforementioned formula (3)), followed by carrying out a decarboxylation reaction by heating to produce the vinyl monomer represented by the aforementioned formula (3).

2) Vinyl Form Esterification Process

In this process, an ester form is obtained by reacting the sulfonic acid halide represented by the following formula (25) with the equivalent haloalcohol (ROH):

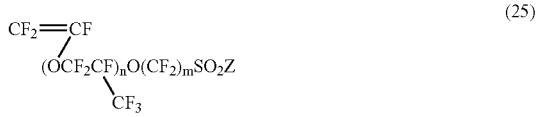

(25)

(wherein, Z represents a halogen atoms such as F or Cl, and n and m are defined in the same manner as in the aforementioned formula (3)).

Initially, after first protecting the double bond of the vinyl group in the compound of formula (25) by addition of a halogen such as chlorine or bromine, the compound can be reacted with a haloalcohol or its alkoxide followed finally by a de-halogenation reaction using zinc, and so forth, to regenerate the vinyl group.

3) Production Process from Sulfonic Acid Salt

In this process, after first converting the compound represented by the aforementioned formula (22) to the compound represented by the following formula (26) by alkaline treatment:

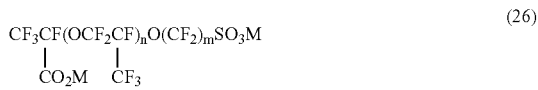

(26)

(wherein, M represents an alkaline metal such as Na or K, and n and m are defined in the same manner as in the aforementioned formula (3)), the compound is decarboxylated by heating to convert to the sulfonic acid salt represented by the following formula (27):

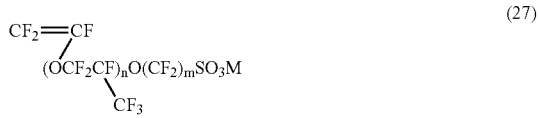

(27)

(wherein, M is defined in the same manner as the aforementioned formula (26), and n and m are defined in the same manner as in the aforementioned formula (3)), followed by chlorinating with a chlorinated phosphorous compound to obtain a sulfonic acid chloride and finally obtaining the ester form using the process of 2) above. This process includes a portion of the process of 2), it is particularly useful in the case of obtaining an ester form in which n=0.

4) Addition Reaction of Haloolefin to Sulfonic Acid

In this process, the sulfonic acid represented by the following formula (28):

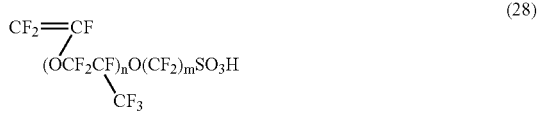

(28)

(wherein, n and m are defined in the same manner as the aforementioned formula (3)) is reacted with a haloolefin represented by the following formula (10):

(10)

(wherein, $R^1$, $R^2$, $R^3$ and $R^4$ are defined in the same manner as in the aforementioned formula (1)).

In the case of this process, haloalkyl group R is —$CR^1R^2CHR^3R^4$.

Specific examples of the haloolefin represented by formula (10) used in this process include, for example, $CHCl=CH_2$, $CCl_2=CH_2$, $CCl_2=CHCl$, $CCl_2=CCl_2$, $CFCl=CF_2$, $CHF=CH_2$, $CF_2=CH_2$, $CF_2=CHF$, $CF_2=CF_2$, $CH_2=CHCF_3$ and $CF_2=CFOCF_3$, while preferable examples include CHF=CH$_2$, CF$_2$=CH$_2$ and CF$_2$=CHF, and the most preferable example is CF$_2$=CH$_2$.

Although the reaction conditions for this process consist only of mixing the sulfonic acid represented by formula (28) and the haloolefin represented by formula (10) under pressure within a pressure range of about 0.1 to 2 MPa, it is preferably carried out within a temperature range of 0° C. to 150° C.

Among the aforementioned processes, a production process that uses a reaction in which a haloolefin is added to a fluorinated monomer having a sulfonic acid group is particularly preferable since the production can be carried out under mild conditions.

Next, an explanation is provided of a production process of a vinyl monomer containing an imido ester group. The most preferable process for producing this monomer is the reaction of a vinyl monomer containing a bis-sulfonylimide group represented by the following formula (12) with a haloolefin having 2 to 10 carbon atoms:

—(CF$_2$)$_m$SO$_2$NHSO$_2$R$_f^2$  (12)

(wherein, m is defined in the same manner as in the aforementioned formula (5), R$_f^2$ represents a perfluoroalkyl group having 1 to 10 carbon atoms, and an ether group, —SO$_2$NHSO$_2$— or —SO$_2$Y (wherein Y represents a fluorine atom or —OH) may be contained in R$_f^2$).

Here, if an —SO$_2$NHSO$_2$— group is contained in R$_f^2$, this bis-sulfonylimide group also reacts with the haloolefin. Moreover, if an —SO$_3$H group is contained in R$_f^2$, this sulfonic acid group also reacts with the haloolefin resulting in the formation of an —SO$_3$R group. This olefin is preferably a fluoroolefin represented by the aforementioned formula (10), and the preferable range is the same as the case of producing an ester of sulfonic acid (previously described).

In the case of a vinyl monomer containing said bis-sulfonylimide group as well, the structure between the vinyl group and the bis-sulfonylimide group represented by the aforementioned formula (12) is as was explained for a vinyl monomer containing an imido ester group. Thus, a specific preferable example of this structure is indicated in the following formula (13):

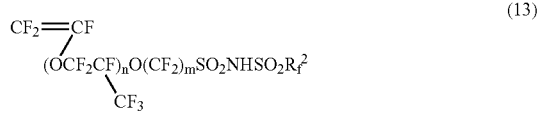

(13)

CF$_2$=CF
 |
 (OCF$_2$CF)$_n$O(CF$_2$)$_m$SO$_2$NHSO$_2$R$_f^2$
  \
   CF$_3$ (wherein, n and m are defined in the same manner as in the aforementioned formula (6), and R$_f^2$ is defined in the same manner as in the aforementioned formula (12)).

In addition, n is preferably 0 and the compound of the following formula (29) is particularly preferable:

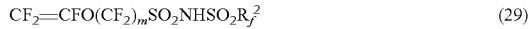

CF$_2$=CFO(CF$_2$)$_m$SO$_2$NHSO$_2$R$_f^2$  (29)

(wherein, m is defined in the same manner as the aforementioned formula (6), and R$_f^2$ is defined in the same manner as the aforementioned formula (12)).

The reaction temperature is normally 0° C. to 200° C., preferably 20° C. to 150° C. and more preferably 50° C. to 150° C. In addition, if the olefin is a gas, the reaction pressure is normally 0.01 to 3 MPa, and preferably 0.05 to 2 MPa. The gas may be vented as necessary during the course of the reaction. As the vinyl monomer containing a bis-sulfonylimide group used as the raw material is normally produced in the form of a salt, it is liberated using a strong acid such as sulfuric acid. However, when carrying out the reaction with an olefin, a strong acid such as sulfuric acid is preferably removed as much as possible. More specifically, it is preferably purified by a method such as distillation prior to the reaction.

When reacting with an olefin, since excess solvent, catalyst and other components are normally not necessary, basically only the product is obtained following the reaction, and is only required to be purified by a method such as distillation.

In addition, the sulfonic acid and bis-sulfonylimide may be put in the form of an Ag salt, and then reacted with an iodide of a haloalkyl group represented by R—I.

Next, an explanation is provided of a polymer containing a vinyl monomer unit having a haloalkyl ester group of a superacid. Said polymer is obtained by polymerizing a vinyl monomer having a haloalkyl ester group of a superacid.

Although polymerization may be homopolymerization or copolymerization, copolymerization with another monomer capable of radical polymerization is preferable due to its superior mechanical strength and, in the case of copolymerization, the copolymerized monomer may be one type or two or more types of fluorine-containing monomers, one type or two or more types of non-fluorine-containing monomers (e.g., ethylene) or a combination of a fluorine-containing monomer and non-fluorine-containing monomer (e.g., alkyl vinyl ether). Among the various types of copolymerized monomers, fluorine-containing monomers are preferable from the viewpoint of chemical stability, preferable examples of which include copolymers with fluoroolefins having 2 to 3 carbon atoms such as tetrafluoroethylene (TFE), chlorotrifluoroethylene (CTFE), trifluoroethylene, vinylidene fluoride, hexafluoropropylene and perfluoromethyl vinyl ether, with copolymers with perfluoroolefins such as TFE and CTFE being particularly preferable, and copolymers with TFE being the most preferable.

If this polymer is a copolymer, the proportion of the vinyl monomer unit containing an ester group of a superacid in the copolymer is preferably 1 mol % or more, more preferably 3 mol % or more, even more preferably 5 mol % or more, and most preferably 9 mol % or more. In the case of using this polymer as the polymer electrolyte for a fuel cell in particular, the content of the ester group of a superacid is preferably within the range of an EW of 500 to 1500 g/eq, more preferably 600 to 1200 g/eq, and particularly preferably 600 to 1000 g/eq when said ester group is converted to a superacid group.

The aforementioned homopolymerization or copolymerization is typically carried out by radical polymerization or radiation-induced polymerization. Although specific examples of polymerization methods that can be used include solvent polymerization as described in Japanese Unexamined Patent Publication No. 57-92026, suspension polymerization or emulsion polymerization using water and so forth for the solvent, bulk polymerization, mini-emulsion polymerization and micro-emulsion polymerization, a polymerization method carried out in the absence of a protic compound is preferable as the ester group is resistant to degradation. A copolymerization carried out in the absence of a protic compound is more preferably solution polymerization or bulk polymerization. In addition to ordinary radical initiators, an initiator such as perfluoroperoxide can be used for the polymerization initiator.

A fluorinated polymer containing a haloalkyl ester group of a superacid may be treated with fluorine gas for the purpose of stabilizing the ends of the main polymer chain and improving durability. This treatment is particularly effective in the case of producing a polymer by radical polymerization using a fluorinated vinyl ether monomer.

Here, an explanation is provided of an imido ester polymer in particular. Although an imido ester polymer can be produced by any method such as suspension polymerization, emulsion polymerization, mini-emulsion polymerization or micro-emulsion polymerization, it is characterized by being able to be produced by solution polymerization in the same manner as the polymerization method of a monomer having an $SO_2F$ terminal (for example, the process described in Japanese Unexamined Patent Publication No. 57-92026). In the case of a bis-sulfonylimide group-containing vinyl polymer in which the acid radical is not protected, as the polymerization initiator degrades due to the action of the strong acid, solution polymerization cannot be used. Thus, only emulsion polymerization could be carried out in the prior art in which water was used for the solvent after having first converted the bis-sulfonylimide group to the salt form. Consequently, in the case of short chain types having a short spacer portion from the main chain to the acid radical or ester group or in the case of monomers having a short terminal perfluoroalkyl group, it was extremely difficult to produce a (co)polymer having low solubility in other fluorine-containing monomers and a high exchange group density. In the case of the present invention, however, as an imido ester group-containing vinyl monomer has high solubility in fluorine-based solvents and other fluorine-containing monomers thereby allowing, for example, solution polymerization using a fluorine-based solvent, it is first possible to produce a polymer having a high density of imido ester groups, and then by doing this, it is possible to produce a (co)polymer having a high exchange group density.

Solution polymerization is preferably carried out in a fluorine-based solvent having high monomer solubility. More specifically, although hydrofluorocarbons (HFCs) such as HFC43-10mee, chlorofluorocarbons (CFCs) such as CFC113, hydrochlorofluorocarbons (HCFCs) such as HCFC225ca/cb, perfluorocarbons (PFCS) such as perfluorohexane, or hydrofluoroethers (HFEs) such as HFE7100 are used, HFCs such as HFC43-10mee are preferable in consideration of the balance between monomer solubility and environmental effects.

Furthermore, although polymers containing bis-sulfonylimide groups can be produced by reacting polymers of the prior art having an $-SO_2F$ terminal with, for example, $CF_3SO_2NH_2$, in the presence of a base, as the side reaction with water is much faster in this case, it is difficult to avoid the presence of sulfonic acid groups, which lower thermal stability, in the resulting polymer. With respect to this point, as the process of the present invention does not use a raw material that yields sulfonic acid groups, polymers can be produced that do not contain sulfonic acid groups. In particular, a bis-sulfonylimide group-containing polymer represented by the following formula (14):

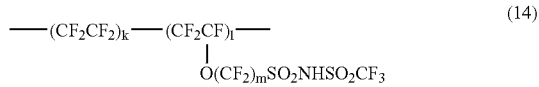

(14)

(wherein, m is defined in the same manner as in the aforementioned formula (3)), which is a bis-sulfonylimide group-containing polymer that does not contain sulfonic acid groups and has an ion exchange capacity as represented by equivalent weight (EW) of 500 to 1500 g/eq, was only able to be produced by solution polymerization using an imido ester group-containing vinyl monomer of the present invention. In this compound of formula (14) as well, the range of EW is preferably 600 to 1200 g/eq, and particularly preferably 600 to 1000 g/eq. The terms k and l in formula (14) are determined so that EW falls within the aforementioned ranges.

Fluorinated polymers containing a haloalkyl ester group of a superacid are characterized by allowing the production of fluorinated superacid polymers by heat treatment or contacting with a protic compound. Namely, the ester group serving as the protecting group of the acid radical can be removed by this type of simple treatment. Here, a fluorinated polymer containing a haloalkyl ester group of a superacid should have a structure in which the superacid group of the fluorinated polymer having a superacid group is haloalkyl esterified. An example of such a polymer is a polymer that contains a vinyl monomer unit containing a haloalkyl ester group of a superacid, is preferably a polymer containing a monomer unit having an ester group of a superacid represented by the aforementioned formula (2) or (5), and more preferably a polymer containing a monomer unit represented by the aforementioned formula (3) or (6).

First, in the case of production by heat treatment, the heating temperature is normally 50° C. to 350° C., preferably 80° C. to 300° C. and more preferably 100° C. to 250° C. If the temperature is too low, production efficiency decreases, and if the temperature is too high, the formed superacid group degrades. If the superacid group is a sulfonic acid group, the heating temperature is preferably somewhat lower. The heating time is preferably 0.1 minute to 1 hour. Heating may be carried out in the presence of a Brø nsted acid or Lewis acid for the purpose of enhancing production efficiency. In the case of producing by heat treatment, as the haloolefin of the monomer raw material is eliminated, it can be recovered and reused.

In the case of contact with a protic compound, examples of protic compounds include, but are not limited to, water as well as alcohols, amines, carboxylic acids, sulfonic acids and phosphonic acids, and a wide range of protic compounds cab be used.

Specific examples of protic compounds include alcohols such as methanol, ethanol and propanol, secondary or primary amines such as diethylamine and carboxylic acids such as acetic acid and propionic acid, and volatile compounds are particularly preferable in consideration of the ease of removal following treatment. Among these protic compounds, water, alcohols and carboxylic acids are preferable with respect to the comparatively fast rate of the reaction and the ease of purifying the target sulfonic acid polymer, with alcohols being more preferable. A protic compound may be used alone or a plurality of protic compounds may be used as a mixture. An aprotic solvent may also be mixed and used. In the case of mixing an aprotic compound, the protic compound is preferably contained at 10% by weight or more in the mixture. In the case of mixing, mixtures containing alcohols, mixtures containing water and mixtures of water and aprotic polar compounds are preferable, with mixtures of water and alcohols being particularly preferable.

Furthermore, a solution or dispersion of a bis-sulfonylimide group-containing polymer in a solvent at least containing a protic compound is novel. Here, although said solvent may be a mixture with an aprotic solvent, in that case, the protic compound is preferably contained in said solvent at 10% by weight or more.

In addition, in the case of a haloalkyl group having a hydrogen at position 1 and a halogen at position 2, an amine-based protic compound is effective. In the case of treatment using an amine-based protic compound, although an amine salt of a superacid polymer forms, a superacid polymer can be easily derived by acidifying the salt.

Although the temperature of contact with a protic compound varies according to the type of protic compound, it is normally 0° C. to 200° C., preferably 30° C. to 150° C. and more preferably 50° C. to 120° C. In the case of containing an alcohol, in particular, it is preferably 0° C. to 120° C., and in the case of containing water, is preferably 100° C. to 200° C. The duration of contact is preferably 0.1 minute to 5 hours.

In the production process of the present invention, in the case of producing a fluorinated sulfonic acid polymer, as production can be carried out without using an inorganic base such as NaOH or KOH used in hydrolysis treatment of an —SO$_2$F functional group of the prior art, there is no occurrence of difficulties in handling caused by swelling of the membrane or problems such as complexity of the process itself.

Solutions or dispersions of fluorinated sulfonic acid polymers used in casting membrane formation and as catalyst binders are typically used in the form of solutions or dispersions of protic solvents such as water and alcohol. This is because there are no other solvents capable of efficiently dissolving said polymers. Thus, when treating a fluorinated polymer containing a fluoroalkyl ester group of sulfonic acid in a protic solvent as previously described, a solution or dispersion of a fluorinated sulfonic acid polymer can be produced directly simply by heating and dissolving. Although any of the aforementioned solvents may be used at this time, water, alcohols and their mixtures are preferable. In the case of carrying out production through dissolution treatment, the heating temperature is normally 50° C. to 250° C. and preferably 100° C. to 200° C. Treatment may be carried out in a pressure-proof vessel as required. The polymer concentration in this case is preferably 0.1 to 30 wt %, and more preferably 1 to 20 wt % as the concentration of fluorinated sulfonic acid polymer in the produced solution or dispersion. If a bis-sulfonylimide group-containing polymer is used in casting membrane formation or as a catalyst binder, a solution or dispersion of the bis-sulfonylimide group-containing polymer can be produced by treating in the same manner under the same conditions.

Furthermore, a solution or dispersion in the present invention refers to a liquid that is visually in the state of a homogeneous solution.

Although a fluorinated superacid polymer produced with the process of the present invention covers all fluorinated polymers having a superacid group, it is preferably a perfluoro superacid polymer, and more preferably a perfluorosulfonic acid polymer represented by the following formula (30) as well as the perfluorobis-sulfonylimide polymer represented by the following formula (31).

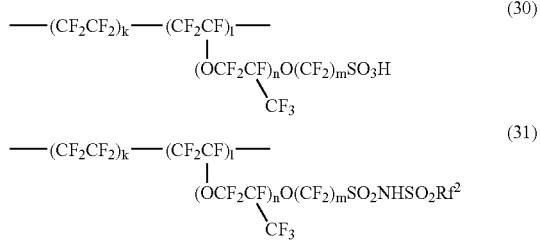

In these formulas, n and m are defined in the same manner as the aforementioned formula (3), and $R_f^2$ is defined in the same manner as in the aforementioned formula (13). The terms k and l are determined so as to obtain the target EW value. Furthermore, n is preferably 0, and m is preferably an integer of 2 to 6, and more preferably an integer of 2 to 4.

In addition, although $R_f^2$ represents a perfluoroalkyl group having 1 to 10 carbon atoms in formula (31), an ether group, —SO$_2$NHSO$_2$— or —SO$_2$Y (wherein Y represents a fluorine atom or —OH) may be contained in $R_f^2$. Here, although —SO$_2$NHSO$_2$— or —SO$_2$Y may be contained in $R_f^2$ in the case of a requirement to increase the number of acid radicals per side chain, in the case of a requirement to obtain a polymer having a high degree of thermal stability, an —SO$_2$Y group is preferably not contained. In the case of containing an —SO$_2$NHSO$_2$— group, the number of said groups is preferably 2 or less, and more preferably 1. In addition, in the case of containing an ether group, the number of said groups is preferably 3 or less, more preferably 2 or less, and even more preferably 1. The number of carbon atoms of $R_f^2$ is preferably 1 to 6, more preferably 1 to 4, even more preferably 1 to 2, and most preferably 1, namely $R_f^2$ is a CF$_3$ group.

A fluorinated superacid polymer produced with the process of the present invention is particularly useful when used in applications accompanied by the formation of a solution or dispersion. Namely, examples of such applications include the case of forming a membrane for a solid polymer electrolyte fuel cell by casting, and use as a catalyst binder of a gas diffusion electrode. Although a solution or dispersion can be produced simultaneous with the production of a fluorinated superacid polymer with a solvent containing a protic compound as described above, dissolution treatment may also be carried out after having first produced the fluorinated superacid polymer.

An imido ester polymer of the present invention can be dissolved or dispersed in a fluorine-containing solvent. This solution or dispersion can also be used to produce a gas diffusion electrode. It is necessary to contact a polymer solution or dispersion with a catalyst metal in the case of using as a catalyst binder as was previously described. At this time, there is the risk of ignition if the solution is combustible. In the case of a fluorine-containing solvent, however, since such solvents are typically non-combustible or only poorly combustible, the risk of ignition during contact can be avoided. The process for producing a gas diffusion electrode is basically the same as previously described. Once a gas diffusion electrode has been produced, as the binder polymer is in an imido ester form, a polymer present in the electrode in ester form can be converted to a polymer containing bis-sulfonylimide groups by subsequently carrying out at least one of the procedures consisting of 1) heating at 50° C. to 350° C. and 2) contacting with a protic compound, on the entire electrode. The treatment conditions are as previously described.

Examples of fluorine-containing solvents that can be used include HFCs such as HFC43-10mee, CFCs such as CFC113, HCFCs such as HCFC225ca/cb, PFCs such as perfluorohexane and HFEs such as HFE7100. Those that are non-combustible are preferable, with HFCs such as HFC43-10mee being preferable in consideration of the balance between monomer solubility and environmental effects. The temperature when dissolved or dispersed is 0° C. to 250° C. and preferably 0° C. to 200° C. Treatment may be carried out in a pressure-proof vessel as required. The polymer concentration in this case is preferably 0.1 to 30 wt %, and more preferably 1 to 20 wt %.

In the case of membrane formation by casting using a solution or dispersion of a fluorinated superacid polymer, the solution or dispersion is poured onto a suitable substrate and then dried followed by separation of the solidified membrane from the substrate. In this case, the solution or dispersion can be dried by heating as necessary. After drying, the characteristics of the membrane can be changed by heat treatment. In the case of the casting membrane formation process, the membrane thickness is preferably 15 to 200 μm, more preferably 10 to 150 μm, and particularly preferably 15 to 100 μm. Although casting membrane formation may be carried out using the fluorinated superacid polymer alone, a suitable reinforcing material may also be used, and a solution or dispersion of a fluorinated superacid polymer may be formed into a membrane by doping onto a porous film such as a polytetrafluoroethylene film.

In the case of a bis-sulfonylimide group-containing polymer in particular, although this polymer has superior heat resistance chemically, as the glass transition temperature is low as compared with a sulfonic acid polymer having the same backbone, it is not always a suitable material for use as a fuel cell membrane for high-temperature operation. However, as a result of filling said polymer into a porous film for reinforcement, there is hardly any deformation at high temperatures, enabling it to be preferably used as a fuel cell membrane having minimal changes in dry and wet dimensions. In order to fill said polymer into a porous film, it is necessary to use a solution or dispersion of a bis-sulfonylimide group-containing polymer obtained in the present invention.

In the case of use as a catalyst binder of a gas diffusion electrode, said gas diffusion electrode can be produced using a process in which a solution or dispersion of a fluorinated superacid polymer is coated onto a gas diffusion electrode produced without using a binder followed by drying, or a process in which an electrically conductive material loaded with a catalyst metal, and a water repellent as necessary, are mixed with a solution or dispersion of a fluorinated superacid polymer and then coated onto a suitable substrate followed by drying. In this case, platinum, palladium, rhodium, ruthenium or their alloys are used for the catalyst metal. Among these, platinum or an alloy thereof is used in many cases. The amount of catalyst loaded is about 0.01 to 10 mg/cm$^2$ in the state in which the electrode has been formed. Various types of metals and carbon materials are used for the electrically conductive material, with carbon black and graphite being used preferably.

A solution or dispersion of a fluorinated superacid polymer produced according to the process of the present invention can be used for either or both membrane and/or catalyst binder.

A solid polymer electrolyte fuel cell membrane/electrode assembly (MEA) is composed of a membrane serving as the electrolyte and a gas diffusion electrode joined to this membrane. The membrane and gas diffusion electrode are joined using a device capable of pressurization and heating, and is typically carried out using, for example, a hot press or roll press. The temperature of the press at that time should be equal to or higher than the glass transition temperature of the membrane, and is typically 130° C. to 250° C. Although the pressure of the press is dependent on the hardness of the gas diffusion electrode used, it is normally 5 to 200 kg/cm$^2$ and preferably 20 to 100 kg/cm$^2$.

Although the following provides a detailed explanation of the present invention based on examples and comparative examples, the present invention is not limited to these examples.

EXAMPLE 1

45.0 g of $CF_2$=$CFOCF_2CF_2SO_3Na$ synthesized according to the process described in International Unexamined Patent Publication No. 98/43952 were mixed with 63 ml of concentrated sulfuric acid followed by vacuum distillation (boiling point: 90° C. to 130° C./0.13 kPa) to obtain 15.6 g of a colorless liquid. This liquid was confirmed to be $CF_2$=$CFOCF_2CF_2SO_3H$ by $^{19}$F-NMR and $^1$H-NMR (yield: 30%, purity: 80%).

$^{19}$F-NMR: δ (ppm, $CFCl_3$ standard) −137.7 (dd, 1F), −124.2(dd, 1F), −118.9 (s, 2F), −116.8 (dd, 1F), −86.0 ppm (s, 2F) $^1$H-NMR: δ ($Me_4Si$ standard) 10.5 (s, 1H)

15 g of $CF_2$=$CFOCF_2CF_2SO_3H$ were placed in a stainless steel 100 ml pressure-proof vessel and pressurized at 0.5 MPa with vinylidene fluoride. Vinylidene fluoride was suitably added and pressurized so as to maintain the internal pressure at 0.5 MPa while stirring at 100° C. After allowing the mixture to react for 5 hours, the pressure was released to obtain 18.8 g of an oily substance. This oily substance was confirmed to be $CF_2$=$CFOCF_2CF_2SO_3CF_2CH_3$ by $^{19}$F-NMR and gas chromatography-mass spectroscopy (GC-MASS).

$^{19}$F-NMR: δ (ppm, $CFCl_3$ standard) −137.2 (dd, 1F), −122.8(dd, 1F), −115.5 (dd, 1F), −114.3 (s, 2F), −84.5 (s, 2F), −58.9 ppm (s, 2F) EI-MS: m/z 100, 97, 81, 65 CI-MS: 360 (M+NH4$^+$)

15 g of the aforementioned sulfonic acid ester monomer, 30 g of HFC43-10mee and 0.5 g of a 5% HFC43-10mee solution of $(CF_3CF_2CF_2COO)_2$ as polymerization initiator were placed in a stainless steel 200 ml pressure-proof vessel followed by adequately replacing the atmosphere inside the vessel with nitrogen and pressurizing to 0.3 MPa with TFE.

TFE was suitably added and pressurized so as to maintain the internal pressure at 0.3 MPa while stirring at 23° C. After allowing the mixture to react for 5 hours, the pressure was released followed by the addition of 30 g of hexane to obtain a swollen white precipitate. This precipitate was then washed three times with hexane/HFC43-10mee (1/1 by volume) followed by drying to obtain 4.8 g of a white solid. Absorbance of the ester groups (1415 cm$^{-1}$) and methyl groups (3000 cm$^{-1}$) were confirmed from the IR spectrum of this solid, and this solid was confirmed to be a sulfonic acid ester polymer.

EXAMPLE 2

0.2 g of the sulfonic acid ester polymer obtained in Example 1 were hot pressed after preheating for 10 minutes at 200° C. in a hot press to obtain a membrane having a thickness of 45 μm. When the IR spectrum of the resulting membrane was measured, the absorbance of the ester groups had completely disappeared and the absorbance of the sulfonic acid groups (970, 1059 cm$^{-1}$) was confirmed to have appeared. In addition, the exchange group capacity, as measured by titration, was 920 g/eq in terms of the equivalent weight.

EXAMPLE 3

0.5 g of the sulfonic acid ester polymer obtained in Example 1 were added to 20 ml of methanol and refluxed while heating for 2 hours. After drying off the solvent, the product was vacuum-dried at 50° C. to obtain a dry polymer. When the IR spectrum of the resulting solid was measured, the absorbance of the ester groups had completely disappeared and absorbance of sulfonic acid groups (970, 1058 cm$^{-1}$) was confirmed to have appeared. In addition, when the exchange group capacity of this polymer was measured by titration, it was found to be 900 g/eq in terms of the equivalent weight.

Next, 0.4 g of the aforementioned fluorinated sulfonic acid polymer and 7.6 g of a water-ethanol mixed solution (1/1 by weight) were charged into a 100 ml pressure-proof vessel equipped with an inner glass cylinder, and stirred while heating for 4 hours at 180° C. After cooling to room temperature, the solid had completely disappeared and the contents of the vessel were in the form of a homogeneous solution when the vessel was opened.

EXAMPLE 4

0.5 g of the sulfonic acid ester polymer obtained in Example 1 and 9.5 g of a water-ethanol mixed solution (1/1 by weight) were charged into a 100 ml pressure-proof vessel equipped with an inner glass cylinder, and stirred while heating for 4 hours at 180° C. After cooling to room temperature, the solid had completely disappeared and the contents of the vessel were in the form of a homogeneous solution when the vessel was opened. This solution or dispersion was poured into a glass Petri dish, air-dried, washed and dried to form a cast membrane having a thickness of 50 μm. When the IR spectrum of the resulting membrane was measured, it was confirmed to be a sulfonic acid membrane. In addition, when the exchange group capacity of this membrane was measured by titration, it was found to be 900 g/eq in terms of the equivalent weight.

EXAMPLE 5

A solution or dispersion obtained in Example 3 was coated onto the ELAT (registered trademark) gas diffusion electrode (Pt loading: 0.4 mg/cm$^2$) manufactured by De Nora North America (USA) to a polymer loaded amount of 0.8 mg/cm$^2$ followed by drying at 140° C. to obtain a gas diffusion electrode.

Two gas diffusion electrodes were made to face each other and the membrane obtained in Example 4 (annealed for 1 hour at 160° C.) was placed between them followed by hot pressing at a temperature of 160° C. and pressure of 50 kg/cm$^2$ to produce an MEA.

Using a carbon cloth having a thickness of about 400 μm for the collector, the MEA and collector were laminated and incorporated in a fuel cell single cell evaluation device. A single cell characteristics test was carried out at normal pressure and cell temperature of 80° C. using hydrogen gas for the fuel and air for the oxidizing agent. The hydrogen gas was humidified at 45° C. and the air was humidified at 55° C. before supplying to the cell. As a result, the cell output voltages were 0.60 and 0.45 V at current densities of 0.5 and 1.0 A/cm$^2$, respectively, thereby confirming the generation of electricity.

EXAMPLE 6

With the exception of using a membrane having a thickness of 50 μm (membrane in which side chain terminals consisting of —SO$_2$F groups were converted to —SO$_3$H groups by subjecting to alkaline saponification followed by acid treatment and washing with water) composed of a polymer (equivalent weight: 950 g/eq) represented by the following formula (32) instead of the membrane obtained in Example 4, an MEA was produced in the same manner as Example 5 followed by carrying out a single cell evaluation.

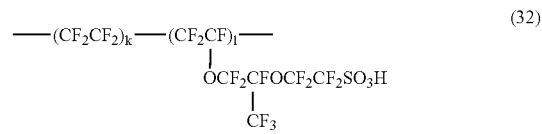

As a result, the cell output voltages were 0.60 and 0.45 V at current densities of 0.5 and 1.0 A/cm$^2$, respectively, thereby confirming the generation of electricity.

EXAMPLE 7

With the exception of using a 5% (by weight water/ethanol (1/1 by weight) solution or dispersion of a polymer (equivalent weight: 950 g/eq) represented by the aforementioned formula (32) instead of the solution or dispersion obtained in Example 3, an MEA was produced in the same manner as Example 5 followed by carrying out a single cell evaluation. As a result, the cell output voltages were 0.60 and 0.45 V at current densities of 0.5 and 1.0 A/cm$^2$, respectively, thereby confirming the generation of electricity.

EXAMPLE 8

44.6 g of the vinyl compound represented by the following formula (33) were dissolved in 30 g of dimethoxyethane followed by the addition of 20.2 g of triethylamine.

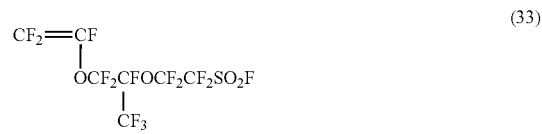

Next, this solution was cooled with ice and then 20.0 g of CF$_3$CH$_2$OH was dropped in over the course of 30 minutes. After continuing to stir for 30 minutes at 0° C. and confirming that the vinyl compound of formula (33) had disappeared by gas chromatography, the reaction solution was poured into ice water to separate the bottom layer. The bottom layer was then washed several times with water to obtain 48.5 g of the ester monomer represented by the following formula (34) (yield: 92%).

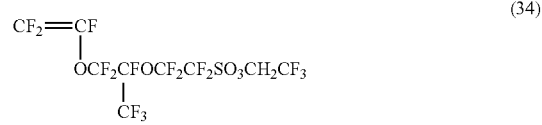

The boiling point of the resulting monomer was 85° C. at 2.7×10$^3$ Pa. The structure of the monomer was confirmed by 19F-NMR.

$^{19}$F-NMR: δ (ppm, CFCl$_3$ standard) −146.6 (q, 1F), −138.6 (ddt, 1F), −124.4 (dd, 1F), −116.9 (dd, 1F), −115.9 (s, 2F), −86.7 (s, 2F), −82.2 (s, 3F), −80.9 (ABq, 2F), −77.5 ppm (t, 3F)

15 g of the aforementioned ester monomer (which was rectified by means of a spinning band distillation apparatus before use), 30 g of HFC43-10mee and 0.64 g of a 5% HFC43-10mee solution of (CF$_3$CF$_2$CF$_2$COO)$_2$ as polymerization initiator were placed in a stainless steel 200 ml pressure-proof vessel followed by adequately replacing the atmosphere inside the vessel with nitrogen and pressurizing to 0.3 MPa with TFE. TFE was suitably added and pressurized so as to maintain the internal pressure at 0.3 MPa while stirring at 25° C. After allowing to react for 3.5 hours, the pressure was released to obtain a swollen white solid. This solid was then washed with acetone followed by drying to obtain 3.2 g of a white powder. Absorbance of the ester groups (1460 cm$^{-1}$) was confirmed from the IR spectrum of this powder.

EXAMPLE 9

0.5 g of the sulfonic acid ester polymer obtained in Example 8 were added to 20 ml of diethylamine and refluxed while heating for 1 hour. After removing the diethylamine, the product was vacuum-dried at 50° C. to obtain a dry polymer. When the IR spectrum of the resulting solid was measured, the absorbance of the ester groups had completely disappeared. Next, this solid was washed with 3N—HCl and water and then was vacuum-dried at 50° C. to obtain a dry polymer. When the IR spectrum of the resulting polymer was measured, and absorbance of sulfonic acid groups (970, 1058 cm$^{-1}$) was confirmed to have appeared. In addition, when the exchange group capacity of this polymer was measured by titration, it was found to be 940 g/eq in terms of the equivalent weight.

EXAMPLE 10

162 g of the vinyl compound represented by the aforementioned formula (33) were dissolved in 120 ml of HFC43-10mee and then 61 g of bromine was dropped in at room temperature. After briefly continuing to stir at room temperature, the excess bromine and solvent were distilled off followed by vacuum distillation (boiling point 110° C. at 6.7 kPa) to obtain 201 g of a colorless liquid. This liquid was confirmed to be a bromine addition product represented by the following formula (35) by $^{19}$F-NMR (yield: 91%).

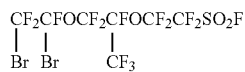
(35)

$^{19}$F-NMR: δ (ppm, CFCl$_3$ standard) −146.6 (s, 1F), −114.0 (s, 2F), −87.5 (dd, 1F), −83.6 (dd, 1F), −81.5 (s, 3F), −81.0 (ABq, 2F), −73.0 ppm (d, 1F), −65.0 (s, 2F), —43.4 ppm (s, 1F)

Next, 200 ml of an ethanol solution in which was dissolved 25.2 g of sodium hydroxide were cooled to 0° C. and then 182.1 g of the resulting bromine addition product of formula (35) were dropped in. This solution was then stirred for 1 hour at 0° C., for 1.5 hours at room temperature, and for 1 hour at 60° C. This reaction solution was then cooled to room temperature and after filtering the solution with celite, the filtrate was concentrated under reduced pressure to obtain 176.2 g of a light yellow solid. This solid was confirmed to a sodium sulfonic acid salt represented by the following formula (36) by $^{19}$F-NMR (yield: 94%).

(36)

$^{19}$F-NMR: δ (ppm, CFCl$_3$ standard) −145.9 (d, 1F), −118.2 (s, 2F), −86.0 (dd, 1F), −82.2 (dd, 1F), −80.5 (s, 3F), −80.0 (ABq, 2F), −73.2 (s, 1F), −65.0 ppm (s, 2F)

30 ml of concentrated sulfuric acid were added to 26.5 g of the resulting sodium sulfonic acid salt of formula (36), to dissolve it, followed by vacuum distillation (boiling point: 125 to 130° C. at 0.13 kPa) to obtain 17.7 g of a colorless liquid. This liquid was confirmed to be the sulfonic acid represented by the following formula (37) by $^{19}$F-NMR and $^1$H-NMR (yield: 69%).

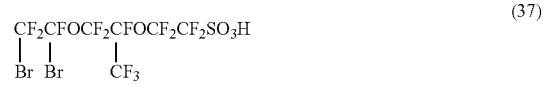
(37)

$^{19}$F-NMR: δ (ppm, CFCl$_3$ standard) −146.6 (s, 1F), −116.9 (s, 2F), −87.5 (t, 1F), −83.0 (t, 1F), −81.5 (s, 3F), −80.6 (ABq, 2F), −73.2 (d, 1F), −65.0 ppm (s, 2F) $^1$H-NMR: δ (Me$_4$Si standard) 12.5 (s, 1H)

14.4 g of the sulfonic acid represented by the formula (37) were placed in a stainless steel 100 ml pressure-proof vessel and pressurized at 0.4 MPa with vinylidene fluoride. Vinylidene fluoride was suitably added and pressurized so as to maintain the internal pressure at 0.4 MPa while stirring at 25° C. After a lowering of the vinylidene fluoride pressure calmed down, the internal pressure at 0.4 Mpa was maintained for further 30 minutes. Then, the pressure was released to obtain 15.4 g of a colorless liquid. This liquid was confirmed to be a sulfonic acid ester represented by the following formula (38) by $^{19}$F-NMR and $^1$H-NMR (yield: 97%).

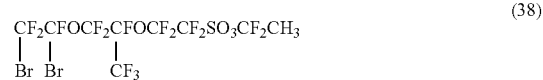
(38)

$^{19}$F-NMR: δ (ppm, CFCl$_3$ standard) −146.6 (s, 1F), −115.0 (s, 2F), −87.4 (t, 1F), −83.0 (t, 1F), −81.3 (s, 3F), −80.6 (ABq, 2F), −72.8 (d, 1F), −64.9 (s, 2F), 59.6 ppm (s, 2F) $^1$H-NMR: δ (Me$_4$Si standard) 1.8 (t, 3H)

11.3 g of the ester form of formula (38), 2.2 g of zinc powder and 40 ml of acetonitrile were mixed in the presence of flowing nitrogen followed by stirring for 5 minutes at 50° C. and filtering the reaction mixture. The filtrate was concentrated under reduced pressure followed by vacuum distillation (boiling point: 66 to 67° C. at 0.8 kPa) to obtain 5.3 g of a colorless liquid. This liquid was confirmed to be the sulfonic acid ester monomer represented by the following formula (39) by $^{19}$F-NMR, $^1$H-NMR and gas chromatography-mass spectrometry (GC-MASS) (yield: 62%).

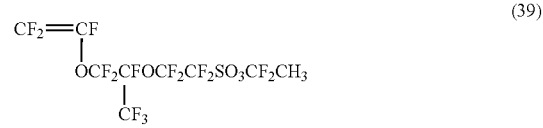
(39)

$^{19}$F-NMR: δ (ppm, CFCl$_3$ standard) −146.5 (s, 1F), −138.6 (dd, 1F), −124.3 (dd, 1F), −116.8 (dd, 1F), −115.5 (s, 2F), −86.5 (q, 2F), −82.1 (s, 3F), −80.8 (q, 2F), −60.1 ppm (s, 2F) $^1$H-NMR: δ (Me$_4$Si standard) 2.0 (t, 3H) EI-MS: m/z 100, 97, 81, 65 CI-MS: 526 (M+NH$_4^+$)

5 g of sulfonic acid ester monomer represented by the aforementioned formula (39), 15 g of HFC43-10mee and 0.12 g of a 5% HFC43-10mee solution of $(CF_3CF_2CF_2COO)_2$ as polymerization initiator were placed in a stainless steel 200 ml pressure-proof vessel followed by adequately replacing the atmosphere inside the vessel with nitrogen and pressurizing to 0.3 MPa with TFE. TFE was suitably added and pressurized so as to maintain the internal pressure at 0.3 MPa while stirring at 23° C. After allowing the mixture to react for 1 hour, the pressure was released to obtain a swollen white solid. This solid was then washed with methanol followed by drying to obtain 3.3 g of a white powder. Absorbance of the ester groups (1415 cm$^{-1}$) was confirmed from the IR spectrum of this powder.

EXAMPLE 11

0.5 g of the sulfonic acid ester polymer obtained in Example 10 and 9.5 g of a water-ethanol mixed solution (1/1 by weight) were charged into a 100 ml pressure-proof vessel equipped with an inner glass cylinder, and stirred while heating for 4 hours at 180° C. After cooling to room temperature, the solid had completely disappeared and the contents of the vessel were in the form of a homogeneous solution when the vessel was opened. This solution or dispersion was poured into a glass Petri dish and air-dried to form a cast membrane having a thickness of 50 μm. When the IR spectrum of the resulting membrane was measured, absorbance of sulfonic acid groups (970, 1058 cm$^{-1}$) was confirmed to have appeared. In addition, when the exchange group capacity of this membrane was measured by titration, it was found to be 980 g/eq in terms of the equivalent weight.

EXAMPLE 12

22.3 g of the vinyl compound represented by the aforementioned formula (33) were dissolved in 20 g of dimethoxyethane followed by the addition of 10.1 g of triethylamine. Next, this solution was cooled with ice and then 16.8 g of $(CF_3)_2CHOH$ were dropped in over the course of 40 minutes. After continuing to stir for 1.5 hours at 0° C. and confirming that the vinyl compound of formula (33) had almost disappeared by gas chromatography, the reaction solution was poured into ice water to separate the bottom layer. The bottom layer was then washed several times with water to obtain 24.7 g of the ester monomer represented by the following formula (40) (yield: 83%).

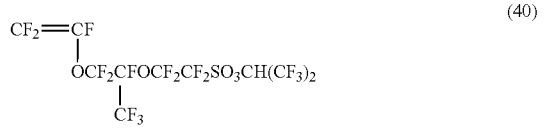

(40)

The boiling point of the resulting monomer was 80° C. at 2.7×10$^3$ Pa. The structure of the monomer was confirmed by $^{19}$F-NMR.

$^{19}$F-NMR: δ (ppm, CFCl$_3$ standard) −146.8 (q, 1F), −138.7 (ddt, 1F), −124.7 (dd, 1F), −117.3 (dd, 1F), −114.8 (s, 2F), −86.9 (s, 2F), −82.5 (s, 3F), −80.5 (ABq, 2F), −75.8 ppm (d, 6F)

15 g of the aforementioned ester monomer (which was rectified by means of a spinning band distillation apparatus before use), 30 g of HFC43-10mee and 0.64 g of a 5% HFC43-10mee solution of $(CF_3CF_2CF_2COO)_2$ as polymerization initiator were placed in a stainless steel 200 ml pressure-proof vessel followed by adequately replacing the atmosphere inside the vessel with nitrogen and pressurizing to 0.3 MPa with TFE. TFE was suitably added and pressurized so as to maintain the internal pressure at 0.3 MPa while stirring at 25° C. After allowing the mixture to react for 3 hours, the pressure was released to obtain a swollen white solid. This solid was then washed with acetone followed by drying to obtain 3.7 g of a white powder. Absorbance of the ester groups (1460 cm$^{-1}$) was confirmed from the IR spectrum of this powder.

EXAMPLE 13

44.6 g of the vinyl compound of the aforementioned formula (33) were dissolved in 30 g of dimethoxyethane followed by the addition of 15.2 g of triethylamine. Next, this solution was cooled in an ice and salt bath and then 19.8 g of $CHF_2CF_2CH_2OH$ were dropped in over the course of 40 minutes. After continuing to stir for 30 minutes, the reaction solution was poured into ice water to separate the bottom layer. The bottom layer was then washed several times with water to obtain 48.6 g of an ester monomer represented by the following formula (41) (yield: 87%).

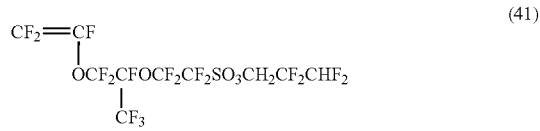

(41)

The boiling point of the resulting monomer was 103° C. at 2.7×10$^3$ Pa. The structure of the monomer was confirmed by $^{19}$F-NMR.

$^{19}$F-NMR: δ (ppm, CFCl$_3$ standard) −146.7 (s, 1F), −139.7 (d, 2F), −138.7 (dd, 1F), −126.5 (t, 2F), −124.4 (dd, 1F), −117.0 (dd, 1F), −115.9 (s, 2F), −86.7 (s, 2F), −82.3 (s, 3F), −81.0 ppm (ABq, 2F)

EXAMPLE 14

13.6 g of $CF_2$=$CFOCF_2CF_2SO_3Na$ synthesized according to the process described in International Unexamined Patent Publication No. 98/43952 were mixed with 17.6 g of phosphorous pentachloride and heated to 150° C. in the presence of flowing nitrogen. The distillate was then collected under normal pressure to obtain 17.2 g of an oily substance.

15 g of bromine were added to 15.9 g of the resulting oily substance followed by stirring for 27 hours at room temperature. After heating to 190° C. at normal pressure to remove the distillate, the remaining liquid was subjected to vacuum distillation (boiling point 90° C. at 1.3×10$^3$ Pa) to obtain 5.4 g of sulfonyl chloride $CF_2BrCFBrOCF_2CF_2SO_2Cl$.

The structure of the resulting sulfonyl chloride was confirmed by $^{19}$F-NMR.

$^{19}$F-NMR: δ (ppm, CFCl$_3$ standard) −110.7 (s, 2F), −84.1 (d, 1F), −79.8 (d, 1F), −72.9 (s, 1F), −64.8 ppm (s, 2F)

After washing 0.48 g of a sodium hydride dispersion (sodium hydride content: 60%) with hexane in the presence of flowing nitrogen, 10 ml of dimethoxyethane were added followed by cooling to 0° C. and then 1.1 g of $CF_3CH_2OH$ were dropped in. After stirring this solution for 0.5 hours at 0° C., 5.0 g of the aforementioned sulfonyl chloride were dropped in. After again stirring for 1.5 hours at 0° C., water was added followed by extraction with CFC43-10mee. The solvent was then distilled off to obtain 5.4 g of a colorless oily substance. This oily substance was confirmed to be the ester form $CF_2BrCFBrOCF_2CF_2SO_3CH_2CF_3$ by $^{19}$F-NMR.

$^{19}$F-NMR: δ (ppm, CFCl$_3$ standard) −115.5 (s, 2F), −85.9 (d, 1F), −81.6 (d, 1F), −76.2 (s, 3F), −73.0 (s, 1F), −64.8 ppm (s, 2F)

5.0 g of the aforementioned ester form, 0.83 g of zinc powder and 15 ml of N-methylpyrrolidone were mixed and heated while stirring for 1 hour at 80° C. The reaction mixture was then charged into a Kugel-Rohr distillation device and heated to 200° C. at normal pressure followed by recovering the distillate to obtain 1.6 g of an oily substance. This oily substance was confirmed to be the ester monomer $CF_2$=$CFOCF_2CF_2SO_3CH_2CF_3$ by $^{19}F$-NMR.

$^{19}F$-NMR: δ (ppm, $CFCl_3$ standard) −135.2 (dd, 1F), −123.8 (dd, 1F), −118.4 (s, 2F), −115.8 (dd, 1F), −84.7 (s, 2F), −77.2 ppm (t, 3F)

EXAMPLE 15

After washing 1.76 g of a sodium hydride dispersion (sodium hydride content: 60%) with hexane in the presence of flowing nitrogen, 40 ml of dimethoxyethane were added followed by cooling to −30° C. and then 8.8 g of $(CF_3)_2CHOH$ were dropped in. After stirring this solution for 0.5 hours while heating to 0° C., 20 g of sulfonyl chloride $CF_2BrCFBrOCF_2CF_2SO_2Cl$, which was synthesized in the same manner as Example 14, were dropped in. After again stirring for 1.5 hours at 0° C., water was added followed by extraction with CFC43-10mee. The solvent was then distilled off to obtain 22.8 g of a colorless oily substance.

The aforementioned oily substance was mixed with 3.6 g of zinc powder and 50 ml of N-methylpyrrolidone and heated while stirring for 1 hour at 80° C. A volatile component was collected from the reaction mixture under reduced pressure followed by further redistillation to obtain 10.2 g of an oily substance. Boiling point was 35° C. at 46 Pa. This oily substance was confirmed to be the ester monomer $CF_2$=$CFOCF_2CF_2SO_3CH(CF_3)_2$ by $^{19}F$-NMR.

$^{19}F$-NMR: δ (ppm, $CFCl_3$ standard) −137.5 (dd, 1F), −122.5 (dd, 1F), −114.7 (dd, 1F), −113.9 (s, 2F), −84.4 (s, 2F), −74.6 ppm (d, 6F)

EXAMPLE 16

1.98 g of a sodium hydride dispersion (sodium hydride content: 60%) were washed with hexane in the presence of flowing nitrogen followed by the addition of 20 ml of dimethoxyethane and cooling to 0° C. A solution in which 4.5 g of $CF_3CH_2OH$ were dissolved in 10 ml of dimethoxyethane was then dropped into this liquid. This solution was stirred for 2.5 hours at room temperature to prepare a $CF_3CH_2ONa$ solution. On the other hand, 5.3 g of sodium carbonate were dispersed in 20 ml of dimethoxyethane in a separate container after which $CF_3CF(COF)OCF_2CF_2SO_2F$ was dropped in so as to maintain the temperature at 40° C. or lower. After continuing to stir for 1 hour at 40° C., the solution was cooled to 0° C. The aforementioned $CF_3CH_2ONa$ solution was then dropped in this solution. After continuing to stir for 1 day at room temperature, the solvent was distilled off under reduced pressure to prepare 28 g of the crude ester $CF_3CF(CO_2Na)OCF_2CF_2SO_3CH_2CF_3$.

Next, 5.0 g of the aforementioned crude ester was dissolved in 20 ml of Diglyme and heated for 1 hour at 150° C. When this solution was analyzed by gas chromatography and $^{19}F$-NMR, the same $CF_2$=$CFOCF_2CF_2SO_3CH_2CF_3$ as that obtained in Example 14 was confirmed to have been formed.

EXAMPLE 17

26 g of $CF_2$=$CFOCF_2CF_2SO_2NHSO_2CF_3$ were placed in a stainless steel 200 ml pressure-proof vessel and pressurized at 0.8 MPa with vinylidene fluoride. Vinylidene fluoride was suitably added and pressurized so as to maintain the internal pressure at 0.8 MPa while stirring at 55° C. After allowing to react for 5.5 hours, the pressure was released to obtain 29.08 g of an oily substance. This oily substance was further distilled under reduced pressure to obtain 28.41 g of a colorless liquid. Boiling point was 42° C. at 7.0×10$^{-3}$ Pa. A structure of product was confirmed to be imido ester monomer $CF_2$=$CFOCF_2CF_2SO_2N(CF_2CH_3)SO_2CF_3$ by $^{19}F$-NMR and $^1H$-NMR.

$^{19}F$-NMR: δ (ppm, $CFCl_3$ standard) −138.2 (dd, 1F), −123.2 (dd, 1F), −115.9 (dd, 1F), −108.0 (s, 2F), −84.4 (s, 2F), −72.7 (s, 3F), −60.3 (s, 2F) $^1H$-NMR: δ (ppm, TMS standard) 2.87 (t, 3H) EI-MS (m/z): 312, 196, 100, 69 CI-MS (m/z): 474 [M+H]$^+$

EXAMPLE 18

A solution in which 15 g of imido ester monomer obtained in Example 17 was dissolved in 30 g of HFC43-10mee (to which was added 1.5 g of B/Super I activated alumina and it was filtered before use), and a polymerization initiator in the form of 19.38 g of a 5% HFC43-10mee solution of $(CF_3CF_2CF_2COO)_2$, were placed in a 200 ml stainless steel pressure-proof vessel, and then the atmosphere inside the vessel was replaced with nitrogen. After replacing the nitrogen with TFE, the vessel was pressurized to 0.26 MPa with TFE. The vessel was pressurized by suitably adding TFE so as maintain the inner pressure at 0.26 MPa while stirring at 25° C. After reacting for 0.5 hours, the pressure was released and the resulting emulsion was centrifuged to obtain a white swollen solid. After washing this solid three times with HFC43-10mee, it was dried to obtain 4.4 g of a white solid. The absorbance of the methyl groups (3000 cm$^{-1}$) was observed from the IR spectrum of this solid, and the solid was confirmed to be an imido ester polymer. The resulting polymer was subjected to hot pressing on a hot press after preheating for 10 minutes at 200° C. to obtain a membrane having a thickness of 100 μm. The absorbance of the bis-sulfonylimide groups (1050, 1320 cm$^{-1}$) was observed from the IR spectrum of this membrane, and the N-alkyl groups (at around −60 ppm) were confirmed to have disappeared from solid $^{19}F$-NMR. The EW of this membrane as determined by titration was 1300 g/eq, and the proton conductivity at room temperature was confirmed to be 0.06 S/cm.

EXAMPLE 19

A solution in which 15 g of imido ester monomer obtained using the same process as Example 17 was dissolved in 30 g of HFC43-10mee (to which was added 1.0 g of activated alumina B/Super I and filtered before use), and a polymerization initiator in the form of 1.85 g of a 5% HFC43-10mee solution of $(CF_3CF_2CF_2COO)_2$, were placed in a 200 ml stainless steel pressure-proof vessel, and after adequately replacing the atmosphere inside the vessel with nitrogen, the vessel was pressurized to 0.25 MPa with TFE. The vessel was pressurized by suitably adding TFE so as maintain the inner pressure at 0.25 to 0.28 MPa while stirring at 25° C. After reacting for 6.25 hours, the pressure was released and the resulting white gel was poured into a mixture of HFC43-10mee and n-hexane (20 ml, 50:50 ratio by volume) followed by centrifuging the precipitate gel to obtain a white swollen gel. After washing this gel three times with a mixture of HFC43-10mee and n-hexane (20 ml, 50:50 ratio by volume), it was dried to obtain 3.87 g of a white rubbery solid. The absorbance of the methyl groups (3000 cm$^{-1}$) was observed from the IR spectrum of this solid, and the solid was confirmed to be an imido ester polymer. When a thermogravimetric analysis (TGA) was performed on this polymer in argon at a heating rate of 10 degrees/minute, the mass was reduced due to elimination of N-alkyl groups at a temperature of 80° C. to 160° C.

The resulting polymer was subjected to hot pressing on a hot press after preheating for 10 minutes at 200° C. to obtain a membrane having a thickness of 40 μm. The absorbance of the bis-sulfonylimide groups (1050, 1320 cm$^{-1}$) was observed from the IR spectrum of this membrane, and the N-alkyl groups (at around −60 ppm) were confirmed to have disappeared from solid $^{19}$F-NMR. The EW of this membrane as determined by titration was 1000 g/eq, and the proton conductivity at room temperature was confirmed to be 0.10 S/cm. In addition, when TGA was performed on this membrane in argon at a heating rate of 10 degrees/minute, the thermal degradation starting temperature was 377° C. On the other hand, when TGA was performed under the same conditions on the commercially available sulfonic acid polymer, Nafion 117™, the thermal degradation starting temperature was 312° C.

0.5 g of the aforementioned membrane and 19.5 g of a mixture of ethanol and HFC43-10mee (60:40 ratio by weight) were placed in a 100 ml stainless steel pressure-proof vessel equipped with an inner glass cylinder and heated for 1.5 hours at 200° C. After allowing the mixture to cool to room temperature, the solid had completely disappeared and the contents of the vessel were in the form of a homogeneous solution when the vessel was opened. This solution or dispersion was able to be applied to membrane formation by casting.

EXAMPLE 20

A solution in which 28.4 g of imido ester monomer obtained using the same process as Example 17 was dissolved in 28.4 g of HFC43-10mee (to which was added 1.0 g of activated alumina B/Super I and filtered before use), and a polymerization initiator in the form of 3.71 g of a 5% HFC43-10mee solution of $(CF_3CF_2CF_2COO)_2$, were placed in a 200 ml stainless steel pressure-proof vessel, and after adequately replacing the atmosphere inside the vessel with nitrogen, the vessel was pressurized to 0.25 MPa with TFE. The vessel was pressurized by suitably adding TFE so as maintain the inner pressure at 0.25 MPa while stirring at 25° C. After reacting for 7 hours, the pressure was released and the resulting milk-white high viscous liquid was poured into a mixture of HFC43-10mee and n-hexane (50 ml, 50:50 ratio by volume) followed by centrifuging the precipitate gel to obtain a white swollen gel. After washing this gel three times with a mixture of HFC43-10mee and n-hexane (20 ml, 50:50 ratio by volume), it was dried to obtain 6.19 g of a white rubbery solid. When 50 mg of this solid and 950 mg of HFC43-10mee were mixed and stirred for 30 minutes at room temperature, the solid had completely disappeared and a homogeneous solution was obtained. When $^{19}$F-NMR of this solution or dispersion was determined, the absorbance of N-alkyl groups (−60.8 ppm) was confirmed.

The resulting polymer was subjected to hot pressing on a hot press after preheating for 10 minutes at 200° C. to obtain a membrane having a thickness of 30 μm. The absorbance of the bis-sulfonylimide groups (1050, 1320 cm$^{-1}$) was observed from the IR spectrum of this membrane, and the N-alkyl groups (at around −60 ppm) were confirmed to have disappeared from solid $^{19}$F-NMR. The EW of this membrane as determined by titration was 710 g/eq, and the proton conductivity at room temperature was confirmed to be 0.19 S/cm.

0.5 g of the aforementioned membrane and 9.5 g of a mixture of ethanol and water (50:50 ratio by weight) were placed in a 100 ml stainless steel pressure-proof vessel equipped with an inner glass cylinder and heated for 1 hour at 120° C. After cooling to room temperature, the solid had completely disappeared and the contents of the vessel were in the form of a homogeneous solution when the vessel was opened. This solution or dispersion was able to be applied to membrane formation by casting.

COMPARATIVE EXAMPLE 1

677 mg of sodium carbonate were dissolved in 3.75 ml of water after which 5 g of bis-sulfonylimide monomer $CF_2=CFOCF_2CF_2SO_2NHSO_2CF_3$ were dropped in followed by stirring for 1 hour at room temperature. This monomer solution was mixed with a solution in which 6.68 g of disodium hydrogenphosphate were dissolved in 92.5 ml of water, and then was placed in a 200 ml stainless pressure-proof vessel followed by the addition of polymerization initiators in the form of aqueous sodium peroxodisulfate solution (1.0 g/12.5 ml water) and aqueous sodium hydrogensulfite solution (1.0 g/12.5 ml water), completely replacing the atmosphere inside the vessel with nitrogen and pressurizing to 0.42 MPa with TFE. TFE was suitably added and pressurized so as to maintain the internal pressure at 0.42 MPa while stirring at 25° C. After reacting for 2 hours, the pressure was released, the resulting white suspension was poured into 300 ml of a mixture of concentrated hydrochloric acid and ethanol (50:50 ratio by volume), and the white swollen solid that precipitated was filtered out. After washing this solid with pure water, it was immersed for 5 hours in 150 ml of concentrated hydrochloric acid at room temperature followed by filtering, washing with pure water and drying to obtain 3.53 g of a white solid.

This solid was pressed into a membrane at 200° C., and absorbance of the bis-sulfonylimide groups (1050, 1320 cm$^{-1}$) was observed from the IR spectrum of the resulting membrane having a thickness of 50 μm. In addition, the EW as determined by titration was 3240 g/eq, thereby confirming the ion exchange capacity to be extremely low.

COMPARATIVE EXAMPLE 2

677 mg of sodium carbonate were dissolved in 3.75 ml of water after which 5 g of bis-sulfonylimide monomer $CF_2=CFOCF_2CF_2SO_2NHSO_2CF_3$ were dropped in followed by stirring for 1 hour at room temperature. This monomer solution was mixed with a solution in which 3.34 g of disodium hydrogenphosphate were dissolved in 92.5 ml of water, and then was placed in a 200 ml stainless pressure-proof vessel followed by the addition of 5 ml of HFC43-10mee and polymerization initiators in the form of aqueous sodium peroxodisulfate solution (2.0 g/12.5 ml water) and aqueous sodium hydrogensulfite solution (2.0 g/12.5 ml water), completely replacing the atmosphere inside the vessel with nitrogen and pressurizing to 0.40 MPa with TFE. TFE was suitably added and pressurized so as to maintain the internal pressure at 0.40 MPa while stirring at 25° C. After reacting for 3.5 hours, the pressure was released, the resulting white suspension was poured into 300 ml of a mixture of concentrated hydrochloric acid and ethanol (50:50 ratio by volume), and the white swollen solid that precipitated was filtered out. After washing this solid with pure water, it was immersed for 5 hours in 150 ml of concentrated hydrochloric acid at room temperature followed by filtering, washing with pure water and drying to obtain 0.35 g of a white solid.

This solid was pressed into a membrane at 200° C., and absorbance of the bis-sulfonylimide groups (1050, 1320 cm$^{-1}$) was observed from the IR spectrum of the resulting membrane having a thickness of 40 μm. In addition, the EW as determined by titration was 5300 g/eq, thereby confirming the ion exchange capacity to be extremely low.

COMPARATIVE EXAMPLE 3

A membrane having a thickness of 70 μm composed of a copolymer of $CF_2=CFOCF_2CF_2SO_2F$ and TFE (EW when converted to sulfonic acid form: 860 g/eq) was immersed in a mixed solvent of 50 ml of isopropyl ethyl amine, 30 ml of Diglyme and 5 g of $CF_3SO_2NH_2$ and allowed to react for 6 hours at 130° C. After reacting, the membrane was washed with water, allowed to react for 1 hour at 90° C. in a liquid composed of 15 g of dimethylsulfoxide, 35 g of KOH and 55 g of water, washed with concentrated sulfuric acid, adequately rinsed with water and then dried.

When the IR spectrum of the resulting membrane was measured, although it was demonstrated to consist nearly entirely of a bis-sulfonylimide group-containing polymer, peaks originating in sulfonic acid were observed at 1057 $cm^{-1}$ and 968 $cm^{-1}$. In addition, the molar ratio of bis-sulfonylimide groups to sulfonic acid groups was determined to be 90:10 based on solid $^{19}F$-NMR.

In addition, when the TGA of this membrane was measured in argon at a heating rate of 10 degrees/minute, after observing a small decrease in mass at around 310° C., a large decrease in mass was demonstrated at around 370° C. As a result, this membrane was confirmed to begin to partially degrade even at 310° C.

EXAMPLE 21

(Thermal Degradation Test)

The membrane obtained in Example 19 was cut into a square measuring 3 cm×3 cm, placed in an SUS test tube having an inner diameter of 5 mm and length of 5 cm, and SUS and PTFE lines were respectively connected to both ends. The entire test tube was placed in a 200° C. oven and air was allowed to flow through the SUS line at 20 ml/minute. At this time, the air was humidified by passing through a water bubbler heated to 80° C. located at an intermediate point in the line. The PTFE line on the outlet side was led into 8 ml of dilute aqueous NaOH solution ($6×10^{-3}$ N), and the decomposition products were collected continuously for 8 hours at one hour intervals.

When the products recovered at one hour intervals were measured by ion chromatography, the fluoride ion concentration was found to have remained nearly constant starting in the fourth hour. The amount of fluoride ion formed starting in the fourth hour was only 0.008% by weight per hour based on the polymer weight, thereby confirming that the polymer underwent little thermal oxidative degradation.

COMPARATIVE EXAMPLE 4

A membrane having a thickness of 50 μm composed of a copolymer of $CF_2=CFOCF_2CF_2SO_3H$ and TFE (EW: 740 g/eq) was cut into a square measuring 3 cm×3 cm and subjected to the same thermal degradation test as Example 21. As a result, the amount of fluoride ion formed remained nearly constant from start to finish, and the amount of fluoride ion formed per hour was 0.037% by weight based on the polymer weight, thereby confirming considerable thermal oxidative degradation of the polymer.

EXAMPLE 22

0.5 g of the imido ester type polymer solid obtained in Example 20 were added to 20 ml of methanol and refluxed while heating for 2 hours. After drying off the solvent, the product was vacuum-dried at 50° C. to obtain a dry polymer. When the IR spectrum of the resulting solid was measured, the absorbance of the alkyl groups had completely disappeared and absorbance of bis-sulfonylimide groups (1050, 1320 $cm^{-1}$) was confirmed to have appeared. In addition, when EW of this polymer was measured by titration, it was found to be 710 g/eq.

Next, 0.4 g of the aforementioned polymer and 7.6 g of a water-ethanol mixed solution (50:50 by weight) were charged into a 100 ml pressure-proof vessel equipped with an inner glass cylinder, and heated for 1 hour at 120° C. After allowing to cool to room temperature, the solid had completely disappeared and the contents of the vessel were in the form of a homogeneous solution when the vessel was opened. This solution or dispersion could be applied to membrane formation by casting.

EXAMPLE 23

0.5 g of the imido ester type polymer solid obtained in Example 20 and 9.5 g of a water-ethanol mixed solution (50:50 by weight) were charged into a 100 ml pressure-proof vessel equipped with an inner glass cylinder, and stirred while heating for 2 hours at 180° C. After cooling to room temperature, the solid had completely disappeared and the contents of the vessel were in the form of a homogeneous solution when the vessel was opened. This solution or dispersion was poured into a glass Petri dish and air-dried to form a cast membrane having a thickness of 50 μm. When the IR spectrum of the resulting membrane was measured, it was confirmed to be a bis-sulfonylimide membrane. In addition, when EW of this membrane was measured by titration, it was found to be 710 g/eq.

EXAMPLE 24

9.2 g of a solution or dispersion of the polymer obtained in Example 20 were added to 1 g of platinum-loaded carbon (TEC10E40E, Tanaka Metal, Pt loading: 40% by weight) followed by stirring vigorously with a homogenizer to produce a catalyst ink. This ink was then coated by screen printing onto a PTFE sheet having a thickness of 100 μm so that the electrode surface area was 10 $cm^2$. At that time, the coated amount was such that the amount of platinum used for the anode was 0.15 mg/$cm^2$ and the amount of platinum used for the cathode was 0.30 mg/$cm^2$. After coating and air-drying, the sheet was annealed for 1 hour at 150° C. to obtain a gas diffusion electrode.

A membrane having a thickness of 50 μm composed of a copolymer of $CF_2=CFOCF_2CF_2SO_3H$ and TFE (EW: 740 g/eq) was cut into a square measuring 6 cm×6 cm, and two of the aforementioned gas diffusion electrodes were placed on both sides so as to face each other followed by hot pressing for 5 minutes at 160° C. and 10 MPa to produce a membrane/electrode assembly (MEA). Using carbon cloth having a thickness of about 400 μm for the collector, the MEA and collector were laminated and incorporated in a fuel cell single cell evaluation device (cell size: 10 $cm^2$). A single cell characteristics test was carried out at normal pressure and cell temperature of 80° C. using hydrogen gas for the fuel and air for the oxidizing agent. The hydrogen gas was humidified at 90° C. and the air was humidified at 80° C. before being supplied to the cell. As a result, the cell output voltages were 0.50 and 0.35 V at current densities of 0.5 and 1.0 A/$cm^2$, respectively, thereby confirming the generation of electricity.

As has been described in detail above, the use of a monomer and polymer of the present invention makes it possible to produce a fluorinated superacid polymer, and a solution or dispersion of a fluorinated superacid polymer, which are useful as polymer electrolytes for solid polymer electrolyte fuel cells, using an extremely simple process not found in the prior art. A fluorinated superacid polymer obtained according to the present invention is particularly useful in the production of cast membranes and in catalyst binder applications.

In the case of producing a fluorinated sulfonic acid polymer in particular, the production process can be simplified as it is not necessary to go through an alkaline hydrolysis step. In addition, in the case of producing a bis-sulfonylimide group-containing polymer, the use of the corresponding imido ester monomer facilitates the production of a bis-sulfonylimide group-containing polymer having a high ion-exchange density.

The invention claimed is:

1. A vinyl monomer containing a haloalkyl ester group of a superacid, wherein the vinyl monomer is represented by the following formula (3) or (6):

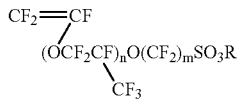
(3)

(wherein, n represents an integer of 0 or 1, m represents an integer of 1 to 6, and R represents a haloalkyl group having 2 to 10 carbon atoms and the halogen in the haloalkyl group is chlorine and/or fluorine),

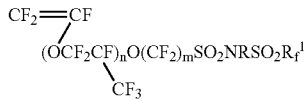
(6)

(wherein, n, m and R are the same as defined in the aforementioned formula (3), and $R_f^1$ represents a perfluoroalkyl group having 1 to 10 carbon atoms, an ether group, $—SO_2NR^aSO_2—$ or $—SO_2X$ (wherein X represents a fluorine atom or $—OR^b$) may be contained in $R_f^1$, and $R^a$ and $R^b$ are respectively and independently selected from the aforementioned R).

2. The vinyl monomer according to claim 1, wherein the haloalkyl group is a hydrocarbon group containing chlorine and/or fluorine represented by the following formula (1):

$$—CR^1R^2CHR^3R^4 \qquad (1)$$

(wherein, $R^1$, $R^2$, $R^3$ and $R^4$ are respectively and independently selected from the group consisting of a chlorine atom, a fluorine atom, a hydrogen atom, a hydrocarbon group having 1 to 8 carbon atoms and a hydrocarbon group containing chlorine and/or fluorine having 1 to 8 carbon atoms, wherein at least one of $R^1$, $R^2$, $R^3$ and $R^4$ is a group selected from the group consisting of a chlorine atom, a fluorine atom and a hydrocarbon group containing chlorine and/or fluorine, wherein $R^1$, $R^2$, $R^3$ and $R^4$ are respectively linked to form a ring structure).

3. The vinyl monomer according to claim 1, wherein the vinyl monomer is represented by the following formula (4):

$$CF_2=CFO(CF_2)_mSO_3R \qquad (4)$$

(wherein, m and R are the same as defined in the aforementioned formula (2)).

4. The vinyl monomer according to claim 1, wherein the vinyl monomer is represented by the following formula (7):

$$CF_2=CFO(CF_2)_mSO_2NRSO_2R_f^1 \qquad (7)$$

(wherein, m and R are the same as defined in the aforementioned formula (3), and $R_f^1$ is the same as defined in the aforementioned formula (5)).

5. A production process of the vinyl monomer according to claim 4 comprising: reacting a vinyl monomer containing a sulfonic acid group represented by the following formula (11) with a haloolefin represented by the aforementioned formula (10):

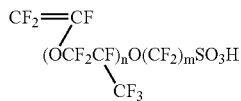
(11)

wherein, n and m are the same as defined in the aforementioned formula (3)).

6. A production process of the vinyl monomer according to claim 1 comprising: reacting a vinyl monomer containing a bis-sulfonylimide group represented by the following formula (13) with a haloolefin represented by the aforementioned formula (10):

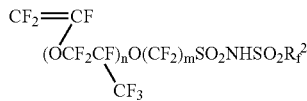
(13)

(wherein, n and m are the same as defined in the aforementioned formula (6), and $R_f^2$ is defined in the same manner as in the aforementioned formula (12)).

7. A polymer containing as a repeating unit at least one type of vinyl monomer according to claim 1.

8. A copolymer comprising at least one type of vinyl monomer according to claim 1 and tetrafluoroethylene.

9. A production process of the polymer according to claim 7 comprising: solution polymerizing a vinyl monomer containing a haloalkyl ester group of a superacid, wherein the number of carbon atoms of the haloalkyl ester group is no more than 10, and the halogen in the haloalkyl group is chlorine and/or fluorine, the vinyl monomer being polymerized either alone or with another monomer.

10. A vinyl monomer containing a haloalkyl ester group of a superacid, wherein the vinyl monomer is represented by the following formula (3) or (6):

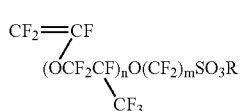
(3)

(wherein, n represents an integer of 0 or 1, m represents an integer of 1 to 6, and R represents a haloalkyl group having 2 to 10 carbon atoms and the halogen in the haloalkyl group is chlorine),

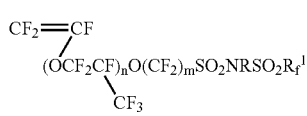
(6)

(wherein, n, m and R are the same as defined in the aforementioned formula (3), and $R_f^1$ represents a perfluoroalkyl group having 1 to 10 carbon atoms, an ether group, $—SO_2NR^aSO_2—$ or $—SO_2X$ (wherein X represents a fluorine atom or $—OR^b$) may be contained in $R_f^1$, and $R^a$ and $R^b$ are respectively and independently selected from the aforementioned R).

* * * * *

UNITED STATES PATENT AND TRADEMARK OFFICE
CERTIFICATE OF CORRECTION

| | | |
|---|---|---|
| PATENT NO. | : 7,473,748 B2 | Page 1 of 1 |
| APPLICATION NO. | : 11/038571 | |
| DATED | : January 6, 2009 | |
| INVENTOR(S) | : Nobuto Hoshi et al. | |

It is certified that error appears in the above-identified patent and that said Letters Patent is hereby corrected as shown below:

On the title page, item [56]:

Column 2 (Other Publications), Line 3, change "00." to --pp.--.

Column 2 (Other Publications), Line 8, change "Inomers" to --Ionomers--.

Column 35, Line 64, change "claim 4" to --claim 1--.

Column 36, Line 9, before "wherein" insert --(--.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,473,748 B2
APPLICATION NO. : 11/038571
DATED : January 6, 2009
INVENTOR(S) : Nobuto Hoshi et al.

It is certified that error appears in the above-identified patent and that said Letters Patent is hereby corrected as shown below:

Column 35, Line 30, after "atoms," insert --wherein--.

Column 35, Line 32, after "and" insert --wherein--.

Column 35, Lines 54-55, claim 3, change "(wherein, m and R are the same as defined in the aforementioned formula (2))." to --(wherein, m represents an integer of 1 to 6, and R represents a haloalkyl group having 2 to 10 carbon atoms).--.

Column 35, Lines 61-62, claim 4, change "is the same as defined in the aforementioned formula (5))." to --represents a perfluoroalkyl group having 1 to 10 carbon atoms, wherein an ether group, -SO$_2$NR$^a$SO$_2$- or -SO$_2$X (wherein X represents a fluorine atom or -OR$^b$) may be contained in R$_f^1$, and wherein R$^a$ and R$^b$ are respectively and independently selected from the aforementioned R).--.

Column 35, Line 64, claim 5, change "claim 4" to --claim 1--.

Column 35, Line 66, claim 5, change "aforementioned" to --following--.

Column 36, Line 1, claim 5, above formula (11), insert
--CR$^1$R$^2$=CR$^3$R$^4$            (10)
(wherein, R$^1$, R$^2$, R$^3$ and R$^4$ are respectively and independently selected from the group consisting of a chlorine atom, a fluorine atom, a hydrogen atom, a hydrocarbon group having 1 to 8 carbon atoms and a hydrocarbon group containing chlorine and/or fluorine having 1 to 8 carbon atoms, wherein at least one of R$^1$, R$^2$, R$^3$ and R$^4$ is selected from the group consisting of a chlorine atom, a fluorine atom and a hydrocarbon group containing chlorine and/or fluorine, wherein R$^1$, R$^2$, R$^3$ and R$^4$ are respectively linked to form a ring structure)--.

Column 36, Line 9, change "wherein, n and m" to --(wherein, n and m--.

Signed and Sealed this
Twenty-fifth Day of January, 2011

David J. Kappos
*Director of the United States Patent and Trademark Office*